United States Patent
Takahashi

(10) Patent No.: US 12,456,156 B2
(45) Date of Patent: Oct. 28, 2025

(54) VIDEO IMAGING APPARATUS, VIDEO IMAGING METHOD, AND VIDEO IMAGING PROGRAM

(71) Applicant: FUJIFILM Corporation, Tokyo (JP)

(72) Inventor: Kosuke Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 331 days.

(21) Appl. No.: 18/057,228

(22) Filed: Nov. 21, 2022

(65) Prior Publication Data

US 2023/0077731 A1   Mar. 16, 2023

Related U.S. Application Data

(63) Continuation of application No. PCT/JP2021/018269, filed on May 13, 2021.

(30) Foreign Application Priority Data

Jun. 26, 2020   (JP) ................................. 2020-110764

(51) Int. Cl.
*G06T 1/20* (2006.01)
*H04N 5/335* (2011.01)
*H04N 25/772* (2023.01)

(52) U.S. Cl.
CPC ............. *G06T 1/20* (2013.01); *H04N 25/772* (2023.01)

(58) Field of Classification Search
CPC ........ G06T 1/20; H04N 25/772; H04N 23/80; G06F 16/78
See application file for complete search history.

(56) References Cited

U.S. PATENT DOCUMENTS

| | | |
|---|---|---|
| 8,422,868 B2 | 4/2013 | Kuriyama |
| 8,878,951 B2 | 11/2014 | Minobe |

(Continued)

FOREIGN PATENT DOCUMENTS

| | | |
|---|---|---|
| CN | 102263889 | 11/2011 |
| CN | 110266951 | 9/2019 |

(Continued)

OTHER PUBLICATIONS

"International Search Report (Form PCT/ISA/210) of PCT/JP2021/018269," mailed on Jul. 13, 2021, with English translation thereof, pp. 1-5.

(Continued)

*Primary Examiner* — Oneal R Mistry
*Assistant Examiner* — Jongbong Nah
(74) *Attorney, Agent, or Firm* — JCIPRNET

(57) ABSTRACT

An imaging unit generates image data of a video as a plurality of frame data that are continuous in a temporal order. An imaging control unit generates metadata indicating an imaging condition of the imaging unit in association with the frame data in a case in which the imaging condition is changed. An output control unit and an external output I/F add the metadata to the frame data and output the frame data to which the metadata is added as video data before demosaicing. In addition, in a case in which a data amount of the metadata associated with the frame data exceeds an addable data amount, the output control unit and the external output I/F add metadata selected based on a priority from among the metadata associated with the frame data to the frame data.

16 Claims, 17 Drawing Sheets

(56) References Cited

U.S. PATENT DOCUMENTS

| | | |
|---|---|---|
| 10,085,000 B2 | 9/2018 | Kuriyama |
| 10,178,342 B2 | 1/2019 | Uemura |
| 10,536,680 B2 | 1/2020 | Kuriyama |
| 10,893,249 B2 | 1/2021 | Kuriyama |
| 11,032,483 B2 | 6/2021 | Saito |
| 11,570,414 B2 | 1/2023 | Kuriyama |
| 2004/0086265 A1* | 5/2004 | Tojo ................ H04N 5/772 386/293 |
| 2005/0002648 A1* | 1/2005 | Hoshino ............ H04N 23/61 386/331 |
| 2009/0244306 A1* | 10/2009 | Saito ............... H04N 1/2166 348/220.1 |
| 2013/0188921 A1 | 7/2013 | Kuriyama |
| 2015/0187390 A1 | 7/2015 | Pacurariu et al. |
| 2018/0027174 A1 | 1/2018 | Sengoku |
| 2020/0145570 A1* | 5/2020 | Umeyama .......... H04N 9/8205 |
| 2022/0279110 A1* | 9/2022 | Suzuki ............. H04N 21/235 |
| 2023/0104653 A1 | 4/2023 | Kuriyama |
| 2024/0146891 A1 | 5/2024 | Kuriyama |

FOREIGN PATENT DOCUMENTS

| | | |
|---|---|---|
| CN | 111095912 | 5/2020 |
| JP | 2002262237 | 9/2002 |
| JP | 2004522355 | 7/2004 |
| JP | 2004312264 | 11/2004 |
| JP | 2009268067 | 11/2009 |
| JP | 2011244423 | 12/2011 |
| JP | 2014049882 | 3/2014 |
| JP | 2017163307 | 9/2017 |

OTHER PUBLICATIONS

"Written Opinion of the International Searching Authority (Form PCT/ISA/237)" of PCT/JP2021/018269, mailed on Jul. 13, 2021, with English translation thereof, pp. 1-8.

"Notice of Reasons for Refusal of Japan Counterpart Application", issued on Jan. 30, 2024, with English translation thereof, p. 1-p. 5.

"Office Action of China Counterpart Application", with English translation thereof, issued on Apr. 10, 2025, pp. 1-16.

"Notice of Reasons for Refusal of Japan Counterpart Application", issued on Sep. 16, 2025, with English translation thereof, p. 1-p. 5.

\* cited by examiner

FIG. 6

HIGH PRIORITY
↑
                                              IMMEDIATE OUTPUT FLAG

| | IMMEDIATE OUTPUT FLAG |
|---|---|
| BLACK OFFSET LEVEL | ☑ |
| COEFFICIENT FOR CONVERTING RAW VALUE | ☑ |
| WHITE BALANCE PARAMETER | ☑ |
| LENS CORRECTION PARAMETER | ☐ |
| COLOR CONVERSION PARAMETER | ☐ |
| GAMMA CORRECTION PARAMETER | ☐ |
| NOISE CORRECTION PARAMETER | ☐ |
| TIME CODE | ☐ |
| IMAGING DATE AND TIME | ☐ |
| PRODUCT NAME | ☐ |

↓
LOW PRIORITY

1

VIDEO IMAGING APPARATUS, VIDEO IMAGING METHOD, AND VIDEO IMAGING PROGRAM

CROSS-REFERENCE TO RELATED APPLICATIONS

This application is a Continuation of PCT International Application No. PCT/JP2021/018269 filed on May 13, 2021, which claims priority under 35 U.S.C § 119(a) to Japanese Patent Application No. 2020-110764 filed on Jun. 26, 2020. Each of the above application(s) is hereby expressly incorporated by reference, in its entirety, into the present application.

BACKGROUND OF THE INVENTION

1. Field of the Invention

The present invention relates to a video imaging apparatus, a video imaging method, and a non-transitory computer readable recording medium storing a video imaging program.

2. Description of the Related Art

JP2017-163307A discloses that, in a configuration in which RAW video data and image correction data output from an imaging unit are input and record in a recording unit or an external recording device, in a case in which a data size of the image correction data exceeds a data size that can be transmitted in one frame, the image correction data is divided into any sizes and separated into a plurality of frames for transmission.

JP2011-244423A discloses that a development parameter (development parameter for video) required for reproducing (developing) RAW video data is generated in a frame unit based on the RAW video data, and the RAW video data and the development parameter with respect to a RAW image frame constituting the RAW video data are recorded in a recording medium.

SUMMARY OF THE INVENTION

One embodiment according to the technology of the present disclosure provides a video imaging apparatus, a video imaging method, and a non-transitory computer readable recording medium storing a video imaging program capable of suppressing an influence of a delay in output of metadata, such as a development parameter, on development processing.

An embodiment according to the technology of the present disclosure relates to a video imaging apparatus comprising an imaging unit that generates image data of a video as a plurality of frame data that are continuous in a temporal order, a metadata generation unit that generates metadata indicating an imaging condition of the imaging unit in association with the frame data in a case in which the imaging condition is changed, and an output control unit that adds the metadata to the frame data and outputs the frame data to which the metadata is added as video data before demosaicing, in which, in a case in which a data amount of the metadata associated with the frame data exceeds an addable data amount, the output control unit adds metadata selected based on a priority from among the metadata associated with the frame data to the frame data.

Another embodiment according to the technology of the present disclosure relates to a video imaging method by a video imaging apparatus including an imaging unit that generates image data of a video as a plurality of frame data that are continuous in a temporal order, the method comprising generating metadata indicating an imaging condition of the imaging unit in association with the frame data in a case in which the imaging condition is changed, adding the metadata to the frame data and outputting the frame data to which the metadata is added as video data before demosaicing, and adding, in a case in which a data amount of the metadata associated with the frame data exceeds an addable data amount, metadata selected based on a priority from among the metadata associated with the frame data to the frame data.

Still another embodiment according to the technology of the present disclosure relates to a non-transitory computer readable recording medium storing a video imaging program of a video imaging apparatus including an imaging unit that generates image data of a video as a plurality of frame data that are continuous in a temporal order, the program causing a processor of the video imaging apparatus to execute a process comprising generating metadata indicating an imaging condition of the imaging unit in association with the frame data in a case in which the imaging condition is changed, adding the metadata to the frame data and outputting the frame data to which the metadata is added as video data before demosaicing, and adding, in a case in which a data amount of the metadata associated with the frame data exceeds an addable data amount, metadata selected based on a priority from among the metadata associated with the frame data to the frame data.

According to one embodiment according to the technology of the present disclosure, it is possible to provide the video imaging apparatus, the video imaging method, and the non-transitory computer readable recording medium storing the video imaging program capable of suppressing the influence of the delay in the output of the metadata on the development processing.

BRIEF DESCRIPTION OF THE DRAWINGS

FIG. 6 is a diagram showing an example of an immediate output flag of the metadata according to a second embodiment.

DESCRIPTION OF THE PREFERRED EMBODIMENTS

In the following, embodiments of the present invention will be described with reference to the drawings.

First Embodiment

<Imaging Apparatus 100 According to First Embodiment>

Figure 1:
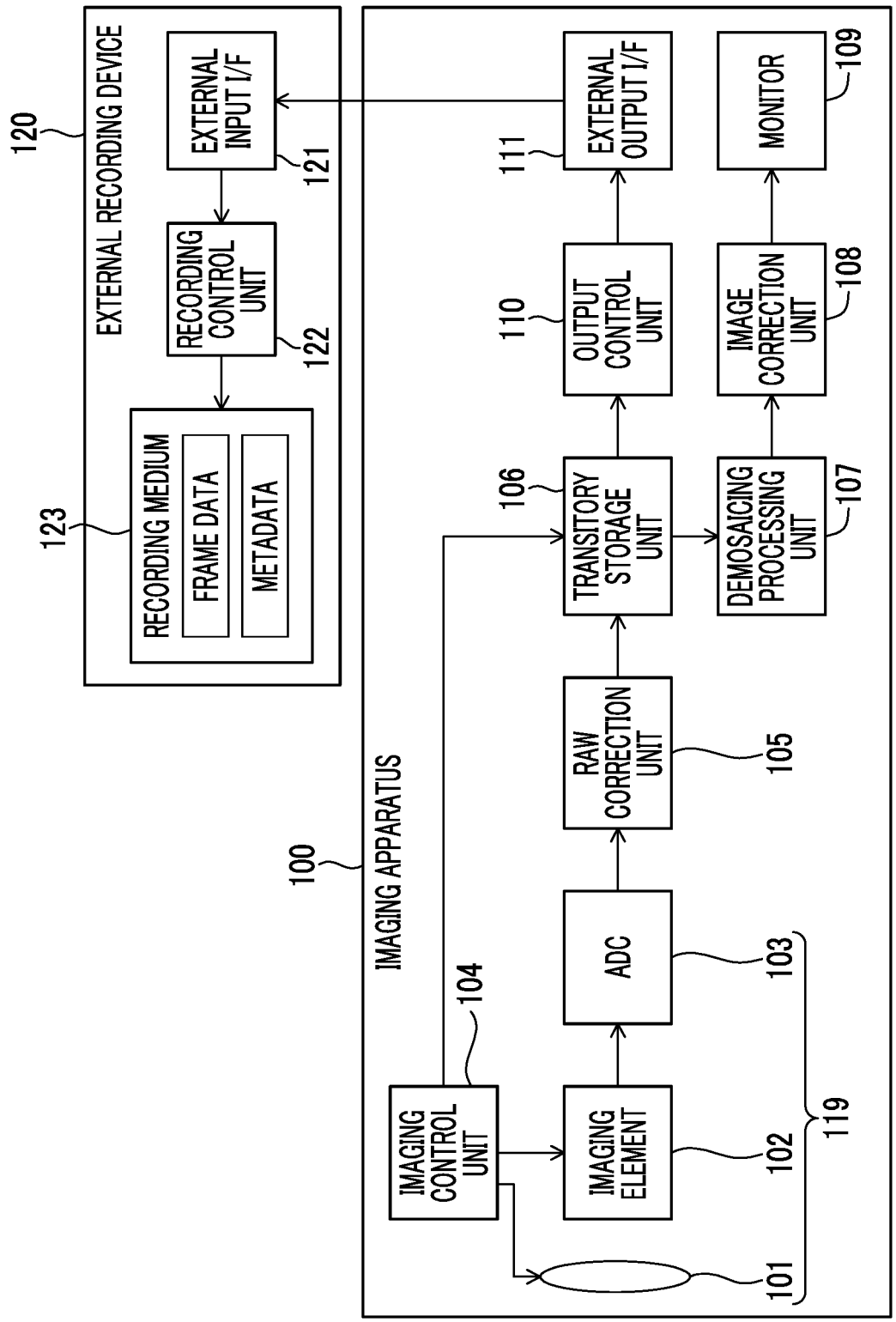
FIG. 1 is a diagram showing an example of an imaging apparatus 100 according to a first embodiment.

FIG. 1 is a diagram showing an example of an imaging apparatus 100 according to the first embodiment. The imaging apparatus 100 is a video imaging apparatus that can generate a video by performing continuous imaging. It should be noted that the imaging apparatus 100 may have a function of generating a still image in addition to a function of generating the video.

An external recording device 120 is provided outside the imaging apparatus 100 and records RAW video data and metadata output from the imaging apparatus 100, which will be described below. A data output terminal of the imaging apparatus 100 is connected to an input terminal of the external recording device 120 via a communication interface, such as a high-definition multimedia interface (HDMI). It should be noted that the HDMI is a registered trademark. The data output from the imaging apparatus 100 is not limited to the HDMI, and may be output by using wireless communication (for example, ultra wide band (UWB) or wireless high-definition multimedia interface-serial digital interface (HDMI-SDI)).

The imaging apparatus 100 comprises an imaging unit 119, an imaging control unit 104, a RAW correction unit 105, a transitory storage unit 106, a demosaicing processing unit 107, an image correction unit 108, a monitor 109, an output control unit 110, and an external output I/F 111.

The imaging unit 119 generates image data of the video as a plurality of frame data that are continuous in a temporal order by performing the continuous imaging. Specifically, the imaging unit 119 includes an imaging lens system 101, an imaging element 102, and an analog/digital converter (ADC) 103. The ADC 103 may be incorporated in the imaging element 102.

The imaging lens system 101 includes a lens for transmitting light from a subject and forming an image on the imaging element 102. In addition, the imaging lens system 101 may also include a stop, a neutral density (ND) filter, a focus lens, a zoom lens, a shift lens, and the like. These movable units of the imaging lens system 101 are controlled by an imaging control unit 104.

The imaging element 102 converts an optical image by the imaging lens system 101 into an analog image signal, and outputs the converted analog image signal to the ADC 103. The imaging element 102 is configured by an imaging element, such as a complementary metal-oxide-semiconductor (CMOS) type image sensor or a charge-coupled device (CCD) type image sensor.

In addition, the imaging element 102 also comprises an electronic shutter that is a shutter for adjusting an exposure time. The imaging by the imaging element 102 is controlled by the imaging control unit 104. For example, during the video imaging, the imaging element 102 performs imaging continuously in a temporal order under the control of the imaging control unit 104 and sequentially outputs the obtained analog image signals to the ADC 103.

The ADC 103 converts the analog image signal from the imaging element 102 into digital frame data, and outputs the converted frame data to the RAW correction unit 105. The frame data continuously output from the ADC 103 is RAW video data before demosaicing.

The imaging control unit 104 controls the imaging by the imaging unit 119 by controlling the imaging lens system 101 and the imaging element 102. For example, the imaging control unit 104 controls focus, exposure, or the like of imaging by the imaging unit 119 in response to an instruction from a user. In addition, the imaging control unit 104 may automatically control the exposure and the like of the imaging by the imaging unit 119 based on a demosaicing image obtained by the demosaicing processing unit 107, which will be described below.

In addition, the imaging control unit 104 also constitutes a metadata generation unit that generates the metadata indicating a condition for the imaging by the imaging lens system 101 and the imaging element 102. The metadata is used in a case in which development processing of generating the demosaicing image based on the RAW video data is performed. A specific example of the metadata will be described below (see FIG. 2, for example).

For example, the imaging control unit 104 generates the metadata indicating each imaging condition of the imaging unit 119 at the start of the imaging by the imaging unit 119 in association with first frame data after the start of the imaging by the imaging unit 119.

Generating the metadata in association with certain frame data means, for example, enabling the output control unit 110, which will described below, to specify that the metadata corresponds to the frame data. As an example, the imaging control unit 104 adds a frame number of the frame data corresponding to the metadata to the metadata.

In addition, in a case in which the imaging condition for the imaging by the imaging unit 119 is changed, the imaging control unit 104 generates the metadata indicating the imaging condition after the change in association with the frame data immediately after the change. On the other hand, the imaging control unit 104 does not newly generate the metadata in a case in which the imaging condition for the imaging by the imaging unit 119 is changed. The imaging control unit 104 performs such processing for each type of metadata.

Therefore, at the start of the imaging by the imaging unit 119, each metadata indicating the imaging condition of the imaging unit 119 at that time is generated in association with the first frame data. Thereafter, only in a case in which the imaging condition is changed, the metadata indicating the changed imaging condition is generated in association with the frame data at that time. The imaging control unit 104 outputs the generated metadata to the transitory storage unit 106.

The RAW correction unit 105 corrects the frame data (RAW video data) output from the ADC 103. The correction performed by the RAW correction unit 105 is correction performed on the RAW video data before the demosaicing processing, and examples thereof include pixel value correction, defective pixel correction, and shading correction in accordance with a characteristic of the imaging element 102 and the like. The RAW correction unit 105 outputs the corrected frame data to transitory storage unit 106.

The transitory storage unit 106 transitorily stores the frame data output from the RAW correction unit 105 and the metadata output from the imaging control unit 104. For example, the transitory storage unit 106 is realized by a memory (of any type), such as a random access memory (RAM). In addition, the transitory storage unit 106 may be realized by a plurality of memories. For example, the transitory storage unit 106 may be realized by a memory that stores the frame data and a memory that stores the metadata.

The demosaicing processing unit 107 generates a demosaicing video by performing the demosaicing processing on the frame data stored in the transitory storage unit 106, and outputs the generated demosaicing video to the image correction unit 108. The frame data that has been subjected to the defective pixel correction, the shading correction, and the like is output from the RAW correction unit 105. Each pixel at this time only has any one of an R color, a G color, or a B color. Therefore, the other two colors are complemented from surrounding pixels such that each pixel has data of three colors. For example, in a case in which the pixel has only the R color, G and B data are not present, so that G color data for that pixel is obtained by performing complement from data of surrounding G pixels or prediction from surrounding G pixels. As a result, each of all pixels has three colors of R, G, and B. This is called the demosaicing processing.

The image correction unit 108 performs various types of image correction on the demosaicing video output from the demosaicing processing unit 107 and outputs the demosaicing video, which has been subjected to the image correction, to the monitor 109. The image correction performed by the image correction unit 108 is processing performed on the demosaicing video after the demosaicing processing, and examples of thereof include processing of peripheral light amount falloff correction, color correction, contour enhancement, noise removal, gamma correction, debayer processing, and compression.

The monitor 109 displays the demosaicing video output from the image correction unit 108 to the user. As a result, the user can confirm the video being captured as a live image during the imaging of the video.

The output control unit 110 and the external output I/F 111 constitute an output unit of one embodiment according to the technology of the present disclosure. The output control unit 110 reads out the frame data and the metadata stored in the transitory storage unit 106 and adds the metadata to the frame data. Moreover, the output control unit 110 outputs the frame data to which the metadata is added from the external output I/F 111 to the external recording device 120 as the RAW video data before the demosaicing.

For example, the output control unit 110 continuously outputs the frame data as a video signal from the external output I/F 111 and outputs the metadata from the external output I/F 111 during a blanking period of the video signal. That is, the output control unit 110 controls the external output I/F 111 to interrupt the output of the frame data and output the metadata. As a result, the metadata can be added to the frame data and output.

The external output I/F 111 is a communication interface for communicating with the external recording device 120. As an example, the external output I/F 111 performs communication by the HDMI. The external output I/F 111 outputs the frame data and the metadata to the external recording device 120 under the control of the output control unit 110.

It should be noted that the imaging apparatus 100 may comprise an internal memory that stores the demosaicing video and the like. In addition, the imaging apparatus 100 may also comprise a user interface that receives various operations from the user and outputs various data to the user.

In addition, the imaging apparatus 100 may also comprise a microphone that converts peripheral sound into an electrical signal. In this case, the electrical signal obtained by the microphone may be converted into digital sound data, output together with the frame data and the metadata from the external output I/F 111 to the external recording device 120, and recorded by the external recording device 120.

The external recording device 120 comprises an external input I/F 121, a recording control unit 122, and a recording medium 123. The external input I/F 121 takes in the frame data and the metadata output from the external output I/F 111 of the imaging apparatus 100 and outputs the taken-in frame data and metadata to the recording control unit 122.

The recording control unit 122 performs control of recording the frame data and the metadata output from the external input I/F 121 in the recording medium 123. The recording medium 123 is a large-capacity recording medium capable of high-speed writing such that large-capacity frame data continuously output from the imaging apparatus 100 can be recorded in real time. For example, the recording medium 123 can be realized by a memory card, a solid state drive (SSD), or the like.

In addition, although not shown, the external recording device 120 includes an external output I/F that outputs the frame data and the metadata stored in the recording medium 123 to an external data processing device (for example, a personal computer) different from the imaging apparatus 100 and the external recording device 120. As a result, the data processing device can perform the development processing based on the frame data and the metadata stored in the recording medium 123.

Alternatively, the external recording device 120 may be a data processing device (for example, a personal computer) including a processor and a memory for performing the development processing. In this case, the external recording device 120 can perform the development processing based on the frame data and the metadata stored in the recording medium 123.

<Hardware Configuration of Imaging Apparatus 100>

The imaging control unit 104, the RAW correction unit 105, the demosaicing processing unit 107, the image correction unit 108, and the output control unit 110 in the imaging apparatus 100 are realized by the processor that is operated in cooperation with the memory of the imaging apparatus 100.

This processor is, for example, a processor, such as a central processing unit (CPU), a micro processing unit (MPU), a field programmable gate array (FPGA), a programmable logic device (PLD), or an application specific integrated circuit (ASIC). This processor functions as a processing unit in the imaging apparatus 100 by reading out and executing a program stored in the memory. More specifically, a structure of these various processors is an electric circuit in which circuit elements, such as semiconductor elements, are combined. It should be noted that this processor may be a combination of a plurality of processors of the same type or different types.

The memory is realized by a RAM, a read only memory (ROM), a flash memory, or the like. The memory stores the program executed by the processor, the data used by the processor, or the like. It should be noted that this memory may be a combination of a plurality of memories of the same type or different types.

<Specific Example of Type of Metadata Generated by Imaging Control Unit 104>

Figure 2:
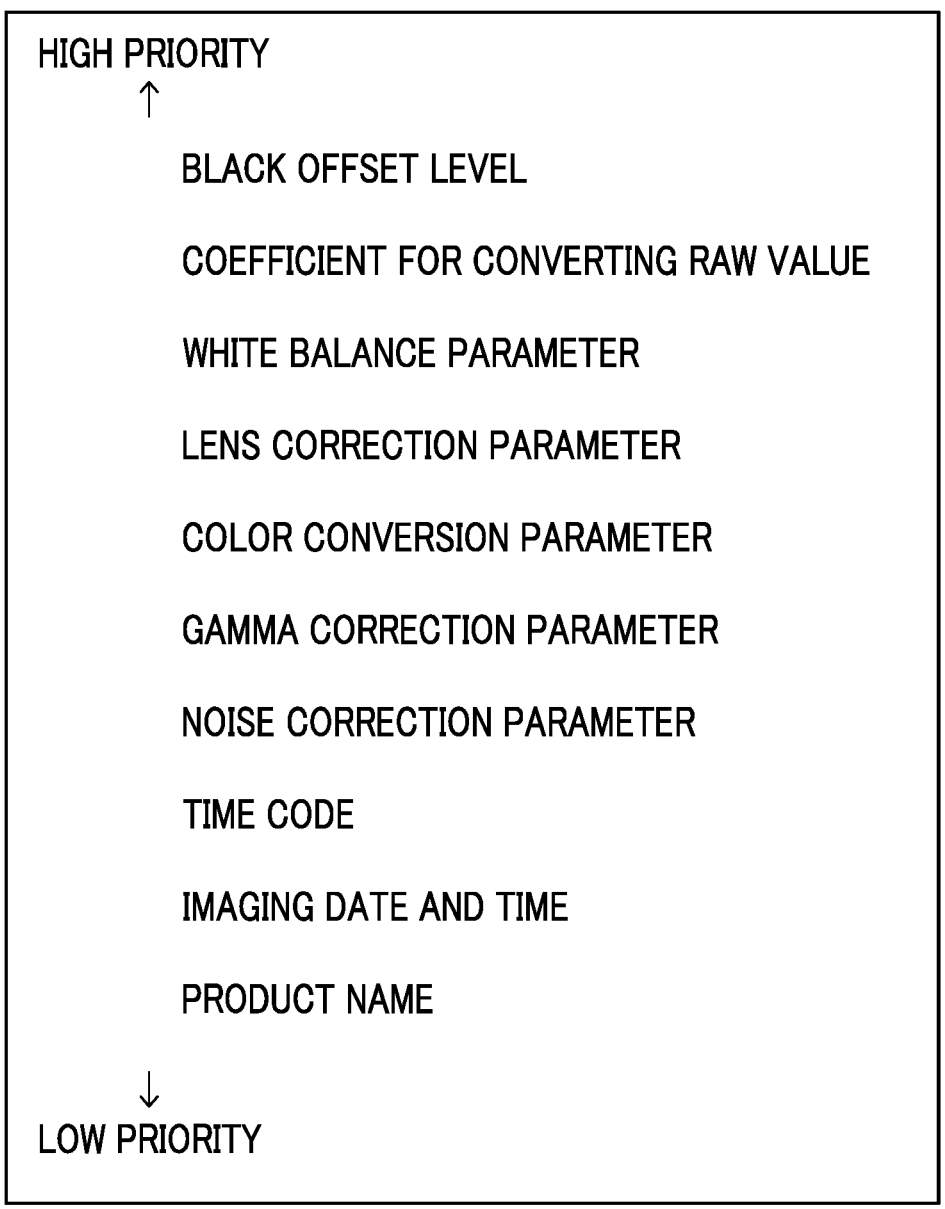
FIG. 2 is a diagram showing a specific example of a type of metadata generated by an imaging control unit 104.

FIG. 2 is a diagram showing a specific example of the type of the metadata generated by the imaging control unit 104. For example, as shown in FIG. 2, the imaging control unit 104 generates the metadata indicating the imaging conditions related to a black offset level, a coefficient for converting a RAW value into a color system, a white balance parameter, a lens correction parameter, a color conversion parameter, a gamma correction parameter, a noise correction parameter, a time code, imaging date and time, a product name, and the like.

In addition, a priority is set in advance for each type of the metadata and stored in the memory of the imaging apparatus 100. The priority indicates a degree of preferential output to the external recording device 120.

For example, the priority of each type of the metadata is set such that the priority of the metadata having a greater influence on a result of the development processing is higher, that is, the metadata having a greater influence on the result of the development processing is preferentially output. Preferentially outputting the metadata having a higher priority means that the metadata having a higher priority is first output for each metadata having the same condition other than the priority.

For example, a higher priority is set for the metadata that is used in processing performed earlier in the development processing because it has a greater influence on an image quality of the demosaicing video obtained by the development processing. In the example shown in FIG. 2, the highest priority is set for the black offset level used in the development processing. On the other hand, the lowest priority is set for the product name that is not directly used in the development processing.

It should be noted that the type of the metadata generated by the imaging control unit 104 is not limited to the example shown in FIG. 2, and can be optionally set. In addition, the priority is not limited to the example shown in FIG. 2, and can be optionally set. For example, at least part of the correction, such as the pixel value correction, the defective pixel correction, and the shading correction performed by the RAW correction unit 105, may be performed in the development processing without being performed by the RAW correction unit 105. In this case, the imaging control unit 104 generates the metadata for performing the correction, such as the pixel value correction, the defective pixel correction, and the shading correction, and outputs the generated metadata to the transitory storage unit 106.

<Generation of Metadata by Imaging Control Unit 104 According to First Embodiment>

Figure 3:
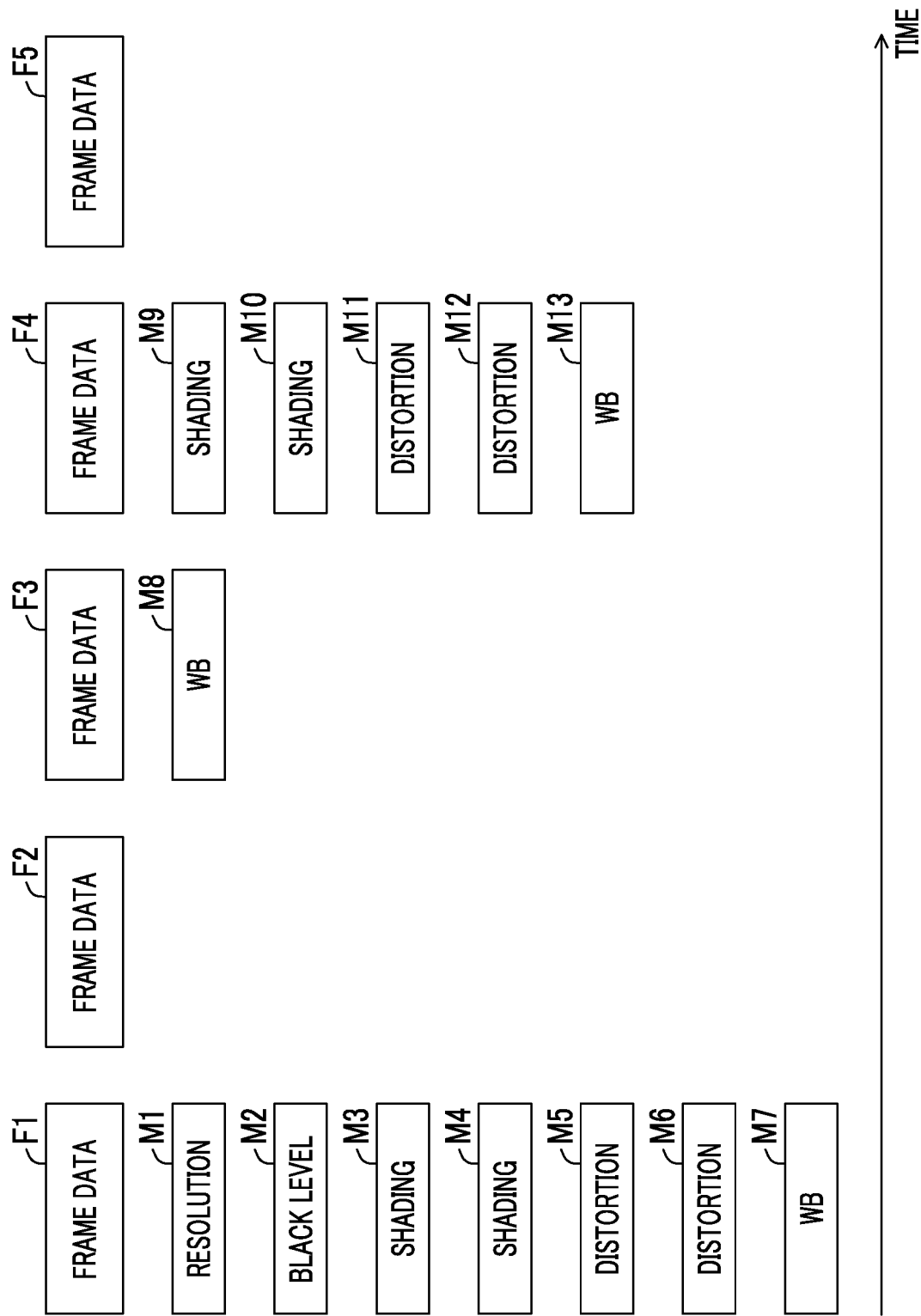
FIG. 3 is a diagram showing an example of generation of the metadata by the imaging control unit 104 according to the first embodiment.

FIG. 3 is a diagram showing an example of the generation of the metadata by the imaging control unit 104 according to the first embodiment. A horizontal axis of FIG. 3 indicates a time. Frame data F1 to F5 are frame data obtained by five continuous imaging by the imaging unit 119, and are the RAW video data before the demosaicing processing.

The metadata M1 to M13 are metadata generated by the imaging control unit 104. The metadata M1 to M7 are data indicating respective imaging conditions set at the start of the imaging, and are generated in association with the first frame data F1 after the start of the imaging.

The metadata M1 is metadata indicating the imaging condition related to the number of pixels (resolution) used in the imaging element 102. The metadata M2 is metadata indicating the imaging condition related to the black offset level (black level). The metadata M3 and M4 are metadata indicating the imaging condition related to shading. The metadata M5 and M6 are metadata indicating the imaging condition related to distortion. The metadata M7 is metadata indicating the imaging condition related to the white balance (WB).

In the example shown in FIG. 3, the imaging condition is not changed between the imaging of the frame data F1 and the imaging of the frame data F2. In this case, the imaging control unit 104 does not generate the metadata associated with the frame data F2.

In addition, in the example shown in FIG. 3, the imaging condition related to the white balance is changed between the imaging of the frame data F2 and the imaging of the frame data F3. In this case, the imaging control unit 104 generates metadata M8 (WB) indicating the imaging condition related to the white balance after the change in association with the frame data F3.

In addition, in the example shown in FIG. 3, the imaging conditions related to the shading, the distortion, and the white balance are changed between the imaging of the frame data F3 and the imaging of the frame data F4. In this case, the imaging control unit 104 generates metadata M9 and M10 indicating the imaging condition related to the shading after the change, metadata M11 and M12 indicating the imaging condition related to the distortion after the change, and metadata M13 indicating the imaging condition related to the white balance after the change in association with the frame data F4.

In addition, in the example shown in FIG. 3, the imaging condition is not changed between the imaging of the frame data F4 and the imaging of the frame data F5. In this case, the imaging control unit 104 does not generate the metadata associated with the frame data F5.

<Output Control by Output Control Unit 110 According to First Embodiment>

Figure 4:
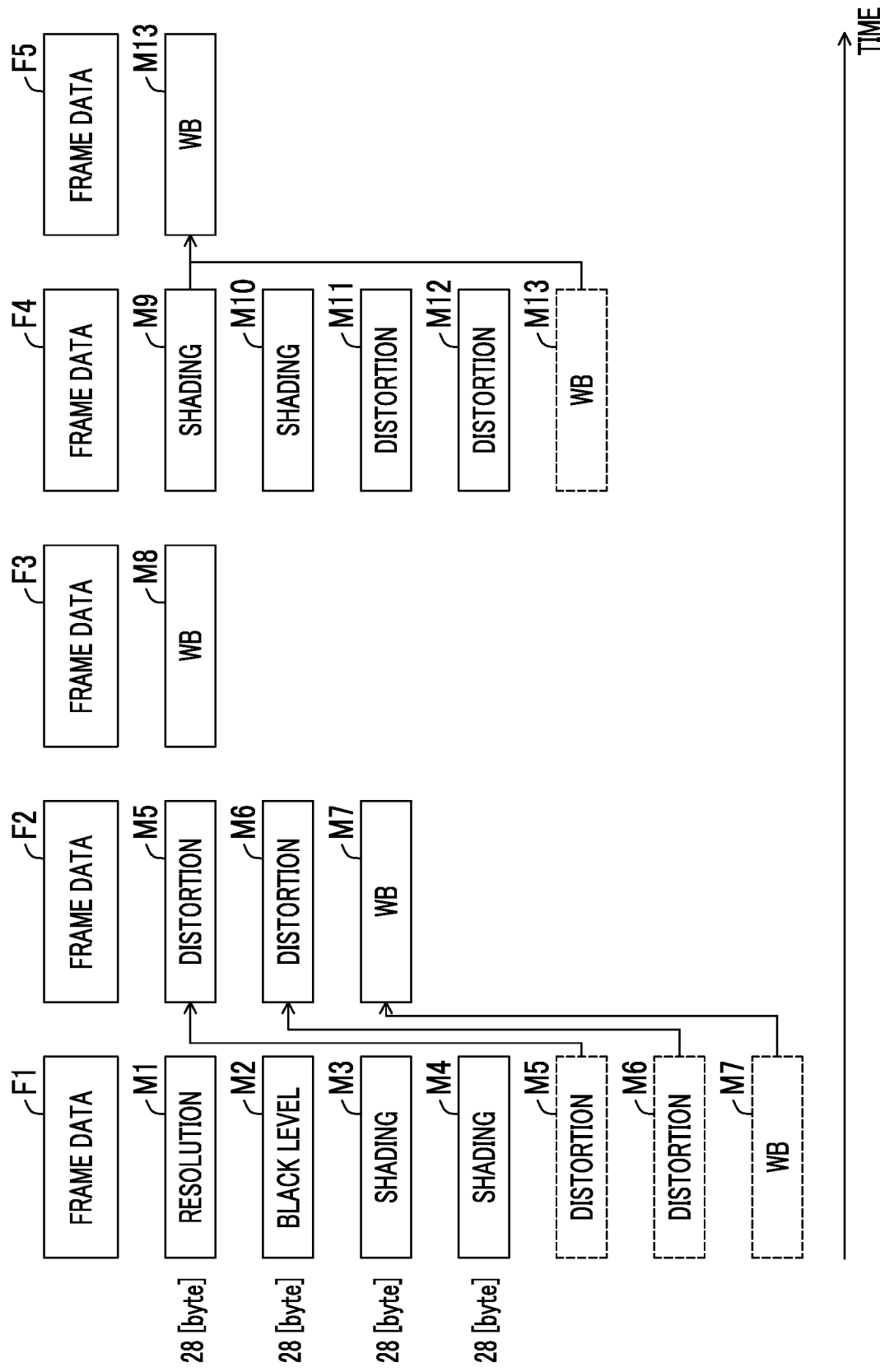
FIG. 4 is a diagram showing an example of output control by an output control unit 110 according to the first embodiment.

FIG. 4 is a diagram showing an example of output control by the output control unit 110 according to the first embodiment. In the example of the generation of the metadata shown in FIG. 3, the output control unit 110 outputs the frame data and the metadata as shown in FIG. 4, for example.

In this example, a data amount of one metadata is 28 [byte], and the capacity of the metadata that can be added to one frame data and output from the external output I/F 111 is 28×4 [byte]. That is, four metadata can be added to one frame data and output. It should be noted that, for example, in the HDMI, a packet container capable of storing the metadata is inserted during the blanking period by hardware, and thus an upper limit of the capacity is determined, and there is a limitation, such as 28×4 [byte]/frame, similarly to this example.

The number of the metadata associated with the frame data F1 is seven, that is, the metadata M1 to M7 which exceed the number of the metadata (four) that can be added to the frame data F1. That is, the data amount of the metadata associated with the frame data F1 is 28×7 [byte], which exceeds the data amount that can be added to the frame data F1 (28×4 [byte]).

In this case, the output control unit 110 adds the metadata selected based on the priorities of the metadata M1 to M7 from among the metadata M1 to M7 associated with the frame data F1 to the frame data F1, and outputs the frame data F1 from the external output I/F 111 to the external recording device 120. In this example, the priority is high in order of the resolution, the black level, the shading, the distortion, and the white balance. In this case, the output control unit 110 adds the four metadata M1 to M4 selected from among the metadata M1 to M7 in descending order of the priorities to the frame data F1, and outputs the frame data F1 from the external output I/F 111 to the external recording device 120.

In addition, the output control unit 110 adds the metadata M5 to M7 which are not added to the frame data F1 to the frame data F2 next to the frame data F1, and outputs the frame data F2 from the external output I/F 111 to the external recording device 120.

In addition, the output control unit 110 adds the metadata M8 associated with the frame data F3 to the frame data F3, and outputs the frame data F3 from the external output I/F 111 to the external recording device 120.

The number of the metadata associated with frame data F4 is five, that is, the metadata M9 to M13 which exceed the number of the metadata (four) that can be added to frame data F4. In this case, the output control unit 110 adds the four metadata M9 to M12 selected from among the metadata M9 to M13 in descending order of the priorities to the frame data F4, and outputs the frame data F4 from the external output I/F 111 to the external recording device 120.

In addition, the output control unit 110 adds the metadata M13 which is not added to the frame data F4 to the frame data F5 next to the frame data F4, and outputs the frame data F5 from the external output I/F 111 to the external recording device 120.

<Specific Example of Development Processing>

The development processing in the example shown in FIG. 4 will be described. In the example shown in FIG. 4, the development processing related to the resolution, the black level, and the shading of the frame data F1 is performed by using the metadata M1 to M4 added to the frame data F1. It should be noted that there is no metadata related to the distortion and the white balance that can be applied to the frame data F1, the development processing of the frame data F1 is performed by using predetermined metadata for the distortion and the white balance.

The development processing related to the distortion and the white balance of the frame data F2 is performed by using the metadata M5 to M7 added to the frame data F2. In addition, the development processing related to the resolution, the black level, and the shading of the frame data F2 is performed by using the metadata M1 to M4.

The development processing related to the white balance of the frame data F3 is performed by using the metadata M8 added to the frame data F3. In addition, the development processing related to the resolution, the black level, the shading, and the distortion of the frame data F3 is performed by using the metadata M1 to M6.

The development processing related to the shading and the distortion of the frame data F4 is performed by using the metadata M9 to M12 added to the frame data F4. In addition, the development processing related to the resolution, the black level, and the white balance of the frame data F4 is performed by using the metadata M1, M2, and M8.

The development processing related to the white balance of the frame data F5 is performed by using the metadata M13 added to the frame data F5. In addition, the development processing related to the resolution, the black level, the shading, and the distortion of the frame data F5 is performed by using the metadata M1, M2, and M9 to M12.

<Processing by Imaging Apparatus 100 According to First Embodiment>

Figure 5:
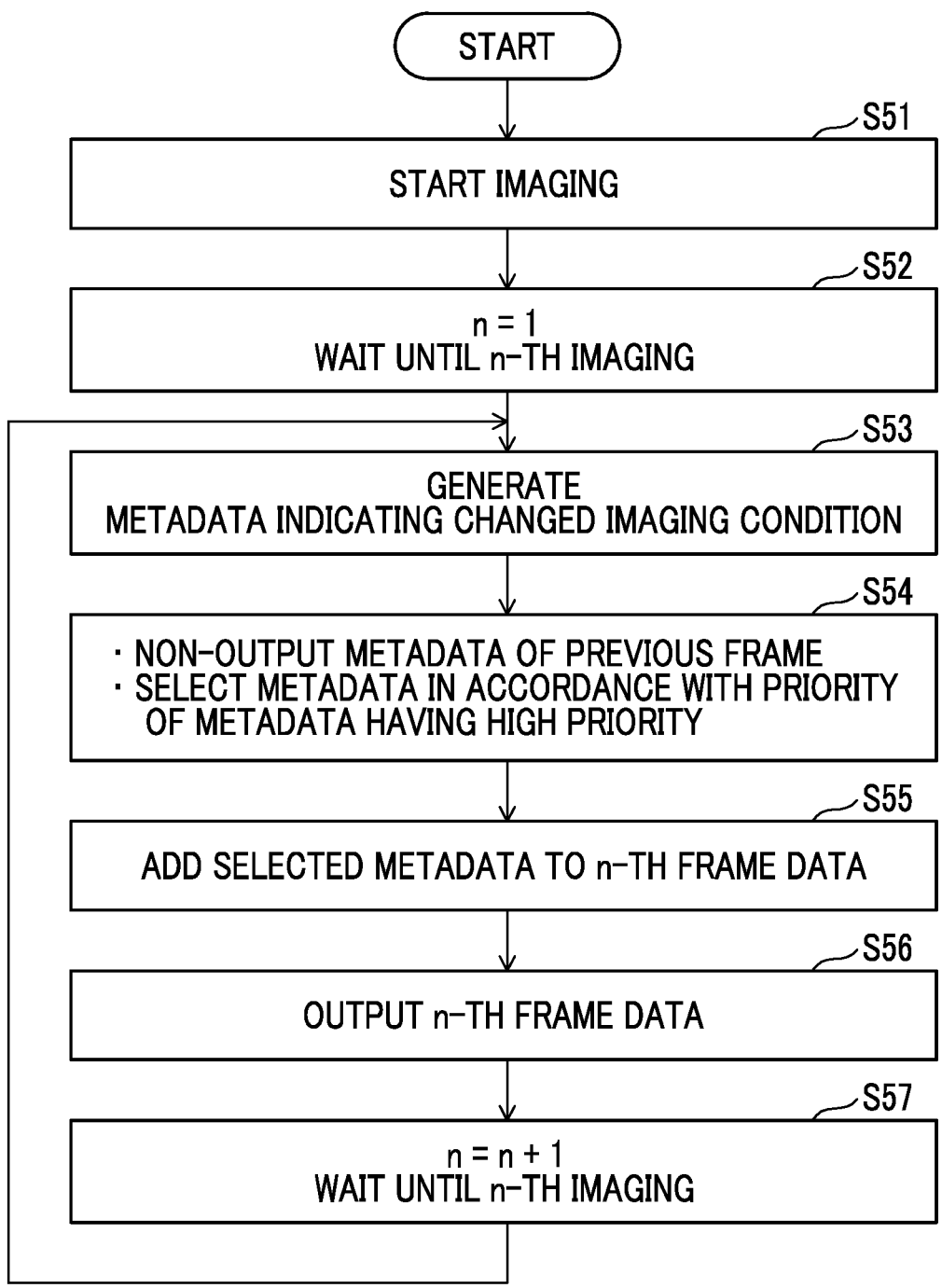
FIG. 5 is a flowchart showing an example of processing by the imaging apparatus 100 according to the first embodiment.

FIG. 5 is a flowchart showing an example of processing by the imaging apparatus 100 according to the first embodiment. The imaging apparatus 100 according to the first embodiment executes the processing shown in FIG. 5, for example. The processing shown in FIG. 5 is executed by the processor that realizes the imaging control unit 104 or the output control unit 110, for example.

First, the imaging apparatus 100 controls the imaging unit 119 to start the imaging of the video (step S51). Next, the imaging apparatus 100 sets n to 1 and waits until n-th imaging by the imaging unit 119 (step S52). n indicates the number of a current processing target frame.

Next, the imaging apparatus 100 generates the metadata indicating the imaging condition changed from n−1th imaging to n-th imaging in association with n-th frame data (step S53). It should be noted that, in a case in which n=1 in step S53, the imaging apparatus 100 generates the metadata for all the imaging conditions in association with the n-th frame data. In addition, in step S53, in a case in which none of the imaging conditions are changed from the n−1th imaging to the n-th imaging, the imaging apparatus 100 does not generate the metadata.

Next, the imaging apparatus 100 selects the metadata to be added to the n-th frame data and output within a range that can be added to one frame data (step S54). In step S54, the imaging apparatus 100 selects the metadata having a higher priority out of non-output metadata (non-output metadata of previous frame) associated with the frame data previous to the n−1th frame data and the metadata associated with the n-th frame data in accordance with an order of priorities.

That is, in a case in which the non-output metadata associated with the frame data previous to the n−1th frame data is present, the imaging apparatus 100 selects that metadata, and selects the metadata having a higher priority among the metadata associated with the n-th frame data in a case in which there is a free space. It should be noted that, in a case in which the non-output metadata associated with the frame data previous to the n−1th frame data is present exceeding the range that can be added to one frame data, the imaging apparatus 100 selects the metadata having a high priority from among that non-output metadata. It should be noted that there may be a case in which the metadata as a selection target is not present in step S54, such as a case in which there is no change in the imaging condition, but in this case, the imaging apparatus 100 does not select the metadata.

Next, the imaging apparatus 100 adds the metadata selected in step S54 to the n-th frame data (step S55). It should be noted that, in a case in which the metadata as the selection target is not present in step S54, the imaging apparatus 100 does not add the metadata.

Next, the imaging apparatus 100 outputs the n-th frame data to which the metadata is added in step S55 from the external output I/F 111 to the external recording device 120 (step S56). It should be noted that, in a case in which the metadata is not added in step S55, the imaging apparatus 100 outputs the n-th frame data to which the metadata is not added from the external output I/F 111 to the external recording device 120.

Next, the imaging apparatus 100 increments n (n=n+1), waits until the n-th imaging by the imaging unit 119 (step S57), and returns to step S53.

As described above, the imaging apparatus 100 according to the first embodiment outputs the frame data (RAW video data) before the demosaicing to the external recording device 120 outside. As a result, it is possible to record the RAW video data with a high data rate even in a case in which the imaging apparatus 100 does not have a high-speed and large-capacity recording medium. In addition, the imaging apparatus 100 also outputs the metadata to the external recording device 120 together with the frame data, thereby facilitating the development processing based on the frame data and the metadata stored in the external recording device 120.

In addition, the imaging apparatus 100 generates the metadata indicating the imaging condition in association with the frame data in a case in which the imaging condition of the imaging unit 119 is changed, adds the generated metadata to the frame data, and outputs the frame data as the video data before the demosaicing. As a result, the data amount of the metadata to be output can be reduced as compared with, for example, a configuration in which all the metadata are output for each frame data without changing the imaging condition.

Therefore, the metadata can be output in a limited communication capacity, such as the blanking period of the frame data. In addition, since it is not necessary to increase the communication capacity during the blanking period, it is possible to suppress the problem that, for example, the frame rate is changed due to the increase in the communication capacity during the blanking period or the connection compatibility specifications cannot be observed.

In addition, in a case in which the data amount of the metadata associated with the frame data exceeds the data amount that can be added to the frame data, the imaging apparatus 100 adds the metadata selected based on the priority based on the type of the metadata from among the metadata associated with the frame data to the frame data. As a result, it is possible to preferentially output the metadata of the type used in the development processing. Therefore, it is possible to suppress the influence on the result of the development processing without outputting all the metadata for each frame data.

For example, at the start of the imaging, the metadata for each imaging condition is generated. In addition, for example, in a case in which the focus of the zoom lens is changed, a lot of new metadata for lens correction are generated. In these cases, although it may not be possible to output the generated metadata in one frame data, with the imaging apparatus 100, it is possible to suppress the influence on the result of the development processing (for example, the image quality of the demosaicing video) by preferentially outputting the metadata of the type used in the development processing.

In addition, the imaging apparatus 100 preferentially adds the metadata which is not added to the first frame data out of the metadata associated with second frame data to be output and the metadata which is not added to the first frame data previous to the second frame data to second frame data. As a result, it is possible to preferentially output the metadata of which output is delayed, and to suppress the influence of the delay in the output of the metadata on the result of the development processing.

Second Embodiment

A different part of the second embodiment from the first embodiment will be described.

<Immediate Output Flag of Metadata According to Second Embodiment>

FIG. 6 is a diagram showing an example of an immediate output flag of the metadata according to the second embodiment. As shown in FIG. 6, each metadata may have the immediate output flag set for each type. The immediate output flag indicates that the metadata should be added to the frame data associated with the metadata and output (that is, immediate output).

The number of the types of the metadata for which the immediate output flags are set is determined, for example, such that all the metadata for which the immediate output flags are set can be added to one frame data. As a result, at least the type of the metadata for which the immediate output flag is set can be added to the frame data associated with the metadata and output without the delay.

In the example shown in FIG. 6, the immediate output flag is set only in three types of the metadata indicating the imaging conditions related to the black offset level, the coefficient for converting the RAW value into the color system, and the white balance parameter.

<Generation of Metadata by Imaging Control Unit 104 According to Second Embodiment>

Figure 7:
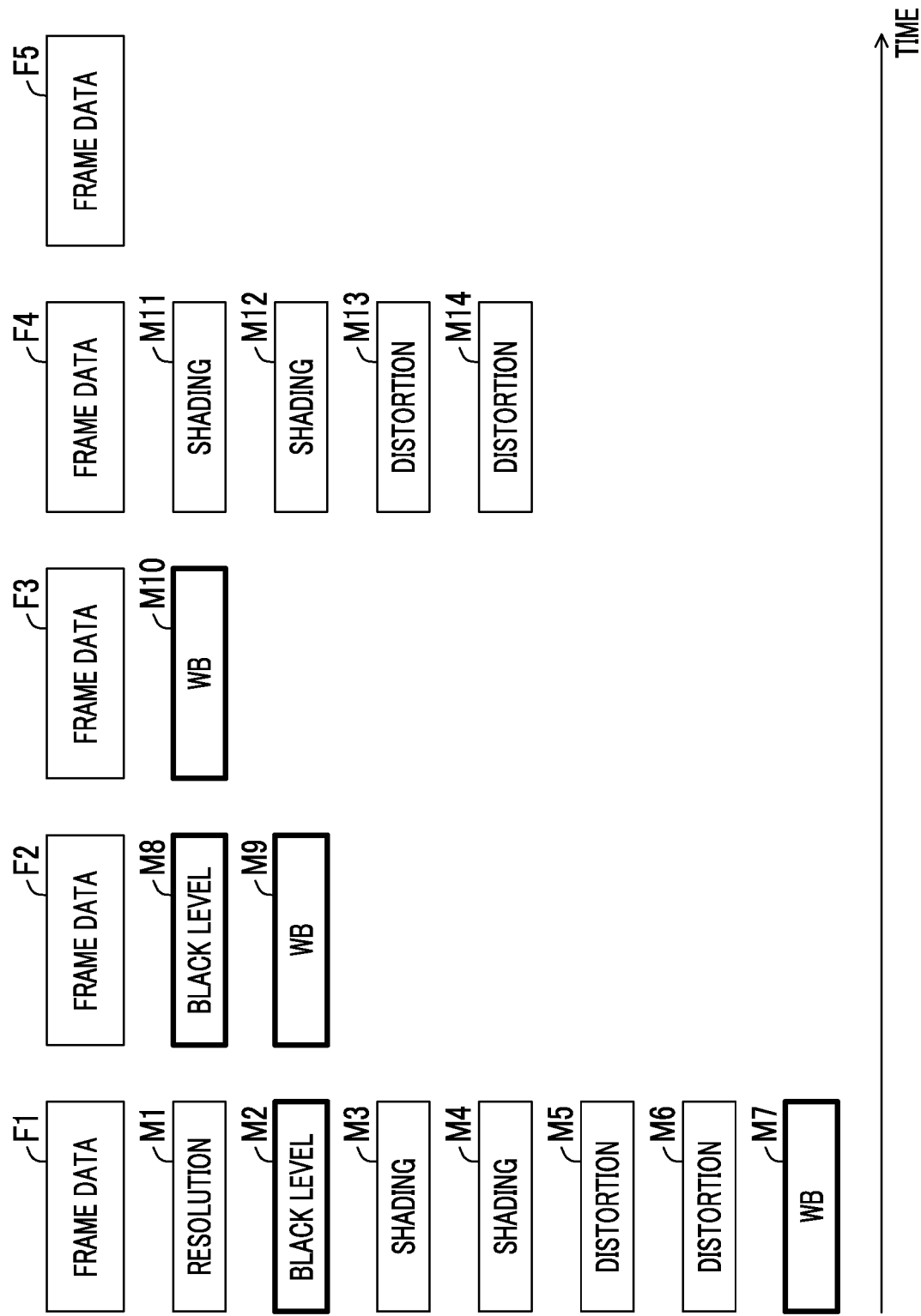
FIG. 7 is a diagram showing an example of generation of the metadata by the imaging control unit 104 according to the second embodiment.

FIG. 7 is a diagram showing an example of the generation of the metadata by the imaging control unit 104 according to the second embodiment. In FIG. 7, the same parts as those shown in FIG. 3 are designated by the same reference numerals, and the description thereof will be omitted.

The metadata M1 to M15 are metadata generated by the imaging control unit 104. The metadata M1 to M7 are data indicating respective imaging conditions set at the start of the imaging, and are generated in association with the first frame data F1 after the start of the imaging.

In the example shown in FIG. 7, the imaging conditions related to the black offset level and the white balance are changed between the imaging of the frame data F1 and the imaging of the frame data F2. In this case, the imaging control unit 104 generates the metadata M8 (black level) indicating the imaging condition related to the black offset level after the change and the metadata M9 (WB) indicating the imaging condition related to the white balance after the change in association with the frame data F2.

In addition, in the example shown in FIG. 7, the imaging condition related to the white balance is changed between the imaging of the frame data F2 and the imaging of the frame data F3. In this case, the imaging control unit 104 generates the metadata M10 (WB) indicating the imaging condition related to the white balance after the change in association with the frame data F3.

In addition, in the example shown in FIG. 7, the imaging conditions related to the shading and the distortion are changed between the imaging of the frame data F3 and the imaging of the frame data F4. In this case, the imaging control unit 104 generates the metadata M11 and M12 indicating the imaging condition related to the shading after the change and the metadata M13 and M14 indicating the imaging condition related to the distortion after the change in association with the frame data F4.

In addition, in the example shown in FIG. 7, the imaging condition is not changed between the imaging of the frame data F4 and the imaging of the frame data F5. In this case, the imaging control unit 104 does not generate the metadata associated with the frame data F5.

<Output Control by Output Control Unit 110 According to Second Embodiment>

Figure 8:
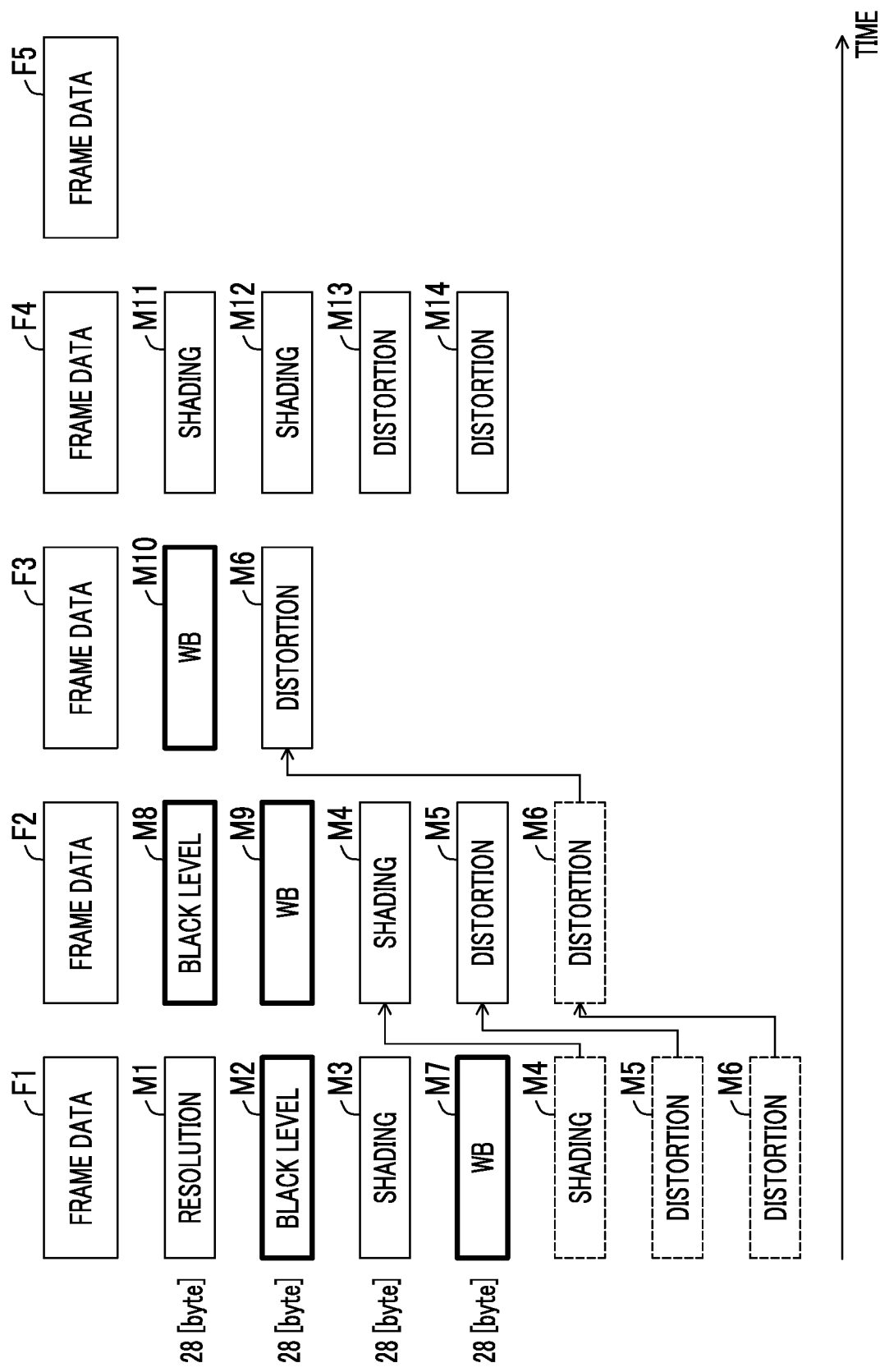
FIG. 8 is a diagram showing an example of output control by the output control unit 110 according to the second embodiment.

FIG. 8 is a diagram showing an example of the output control by the output control unit 110 according to the second embodiment. In the example of the generation of the metadata shown in FIG. 7, the output control unit 110 outputs the frame data and the metadata as shown in FIG. 8, for example. In FIG. 8, the metadata surrounded by a thick line is the metadata of the type for which the immediate output flag is set.

The number of the metadata associated with the frame data F1 is seven, that is, the metadata M1 to M7 which exceed the number of the metadata (four) that can be added to the frame data F1. In this example, the imaging apparatus 100 first selects the metadata M2 and M7 for which the immediate output flags are set, and then selects the metadata M1 and M3 in descending order of the priorities. That is, the imaging apparatus 100 adds the metadata M1 to M3, and M7 to the frame data F1 and outputs the frame data F1 from the external output I/F 111 to the external recording device 120.

In addition, the output control unit 110 selects the metadata to be added to the frame data F2 and output from among the metadata M4 to M6 which are associated with the frame data F1 but not added to the frame data F1, and the metadata M8 and M9 associated with the frame data F2. In this case, the output control unit 110 first selects the metadata M8 and M9 for which the immediate output flag are set, and then selects the metadata M4 and M5 in descending order of the priorities. That is, the imaging apparatus 100 adds the metadata M4, M5, M8, and M9 to the frame data F2 and outputs the frame data F2 from the external output I/F 111 to the external recording device 120.

In addition, the output control unit 110 adds the metadata M6, which is associated with the frame data F2 but not added to the frame data F2, and the metadata M10 associated with the frame data F3 to the frame data F3, and outputs the frame data F3 from the external output I/F 111 to the external recording device 120.

In addition, the output control unit 110 adds the metadata M11 to M14 associated with the frame data F4 to the frame data F4, and outputs the frame data F4 from the external output I/F 111 to the external recording device 120. In addition, the output control unit 110 outputs the frame data F5 from the external output I/F 111 to the external recording device 120 without adding the metadata.

<Processing by Imaging Apparatus 100 According to Second Embodiment>

Figure 9:
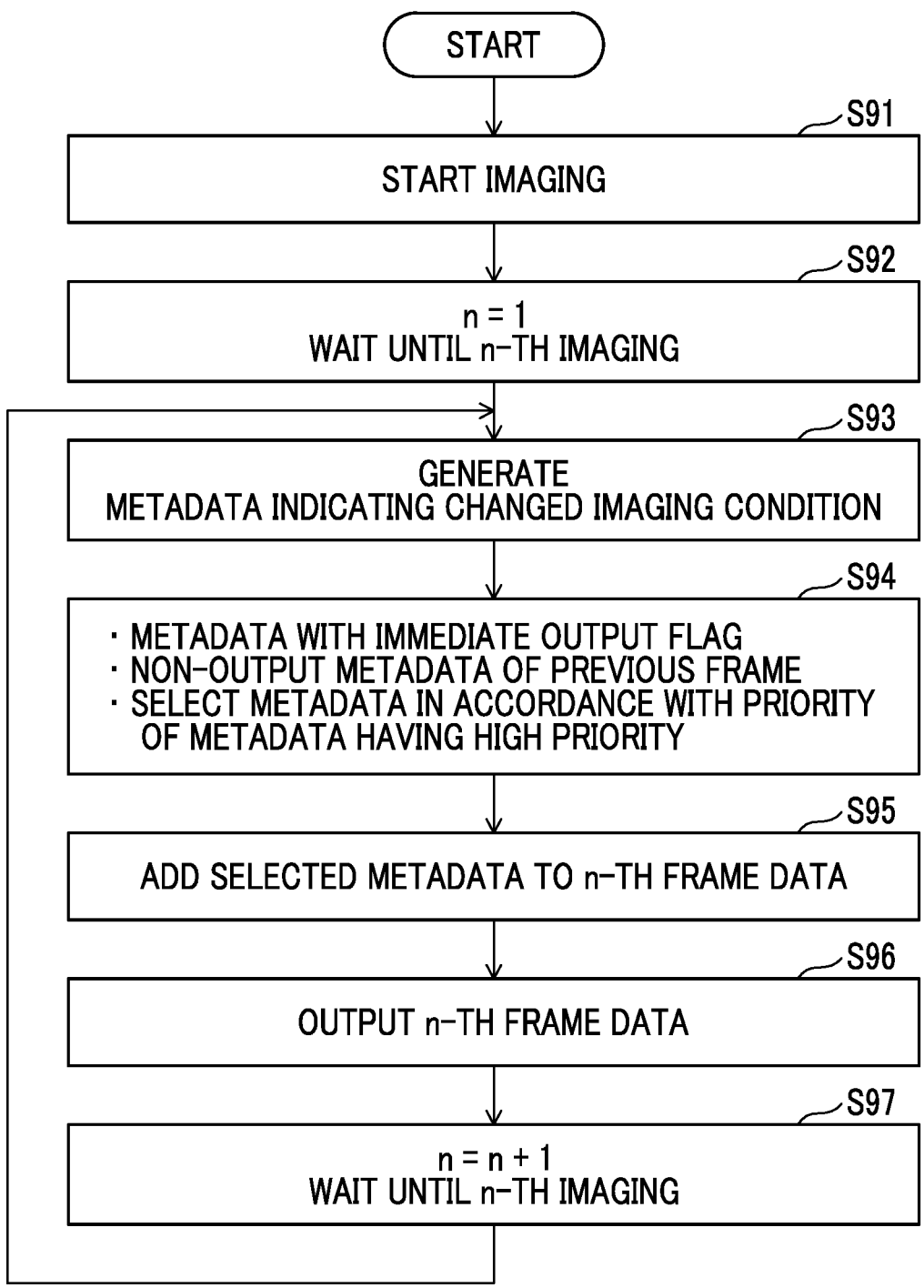
FIG. 9 is a flowchart showing an example of processing by the imaging apparatus 100 according to the second embodiment.

FIG. 9 is a flowchart showing an example of processing by the imaging apparatus 100 according to the second embodiment. The imaging apparatus 100 according to the second embodiment executes the processing shown in FIG. 9, for example. The processing shown in FIG. 9 is executed by the processor that realizes the imaging control unit 104 or the output control unit 110, for example.

Steps S91 to S97 shown in FIG. 9 are the same as steps S51 to S57 shown in FIG. 5. It should be noted that, in step S94, the imaging apparatus 100 selects the metadata with the immediate output flag, the metadata having a higher priority out of the non-output metadata (non-output metadata of previous frame) associated with the frame data previous to the n−1th frame data, and the metadata associated with the n-th frame data in accordance with an order of priorities. That is, in a case in which the metadata which is associated with the n-th frame data and for which the immediate output flag is set is present, the imaging apparatus 100 selects that metadata with the highest priority.

As described above, the output control unit 110 according to the second embodiment outputs the metadata of the type for which the immediate output flag is set earlier than the metadata of which the output is delayed, so that the output of the metadata important in the development processing can be prevented from being delayed.

Third Embodiment

A different part of the third embodiment from the first and second embodiments will be described.

<Generation of Metadata by Imaging Control Unit 104 According to Third Embodiment>

Figure 10:
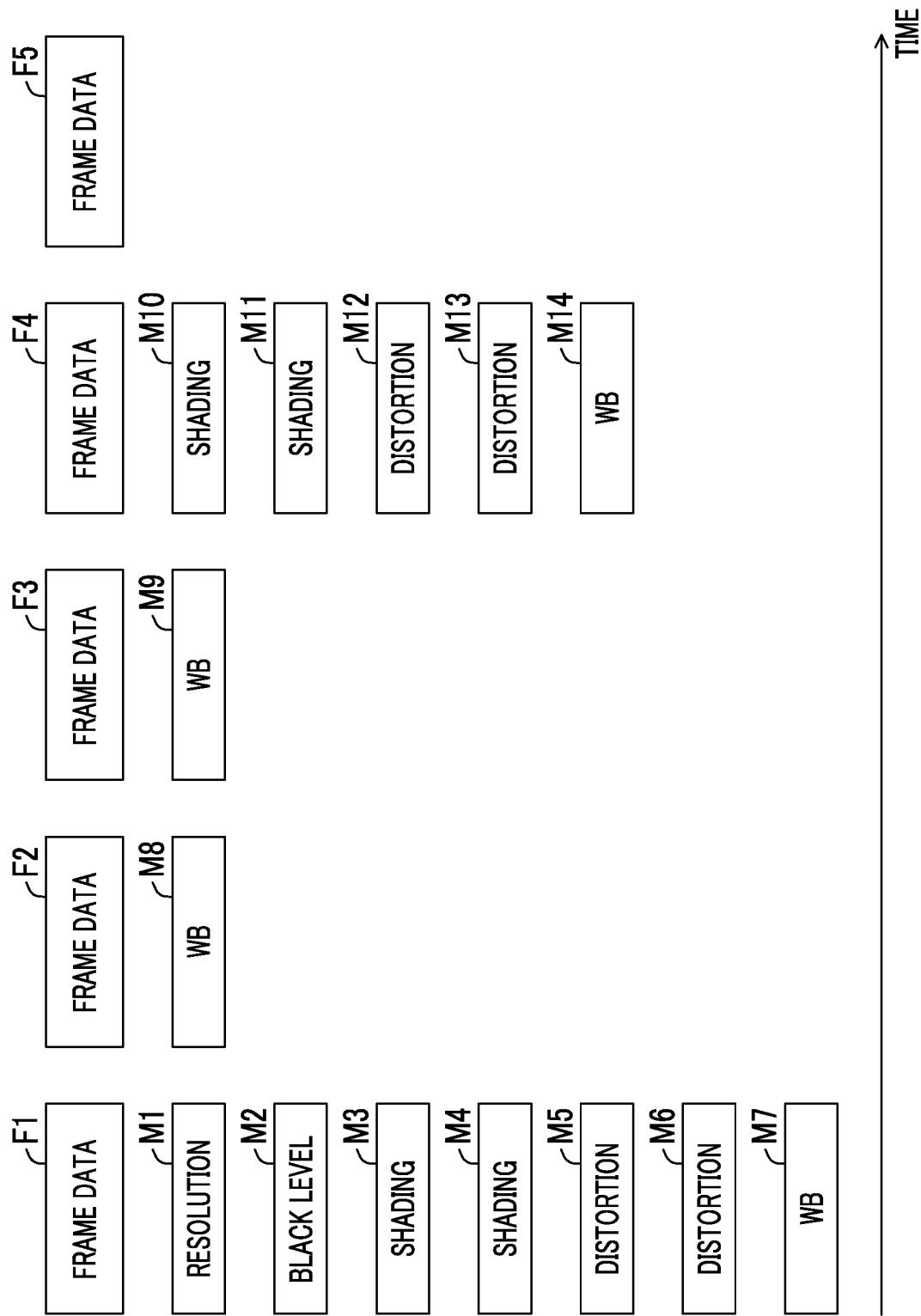
FIG. 10 is a diagram showing an example of generation of the metadata by the imaging control unit 104 according to a third embodiment.

FIG. 10 is a diagram showing an example of the generation of the metadata by the imaging control unit 104 according to the third embodiment. In FIG. 10, the same parts as those shown in FIG. 3 are designated by the same reference numerals, and the description thereof will be omitted.

The metadata M1 to M14 are metadata generated by the imaging control unit 104. The metadata M1 to M7 are data indicating respective imaging conditions set at the start of the imaging, and are generated in association with the first frame data F1 after the start of the imaging.

In the example shown in FIG. 10, the imaging condition related to the white balance is changed between the imaging of the frame data F1 and the imaging of the frame data F2. In this case, the imaging control unit 104 generates the metadata M8 (WB) indicating the imaging condition related to the white balance after the change in association with the frame data F2.

In addition, in the example shown in FIG. 10, the imaging condition related to the white balance is changed between the imaging of the frame data F2 and the imaging of the frame data F3. In this case, the imaging control unit 104 generates the metadata M9 (WB) indicating the imaging condition related to the white balance after the change in association with the frame data F3.

In addition, in the example shown in FIG. 10, the imaging conditions related to the shading, the distortion, and the white balance are changed between the imaging of the frame data F3 and the imaging of the frame data F4. In this case, the imaging control unit 104 generates the metadata M10 and M11 indicating the imaging condition related to the shading after the change, the metadata M12 and M13 indicating the imaging condition related to the distortion after the change, and the metadata M14 indicating the imaging condition related to the white balance after the change in association with the frame data F4.

In addition, in the example shown in FIG. 10, the imaging condition is not changed between the imaging of the frame data F4 and the imaging of the frame data F5. In this case, the imaging control unit 104 does not generate the metadata associated with the frame data F5.

<Output Control by Output Control Unit 110 According to Third Embodiment>

Figure 11:
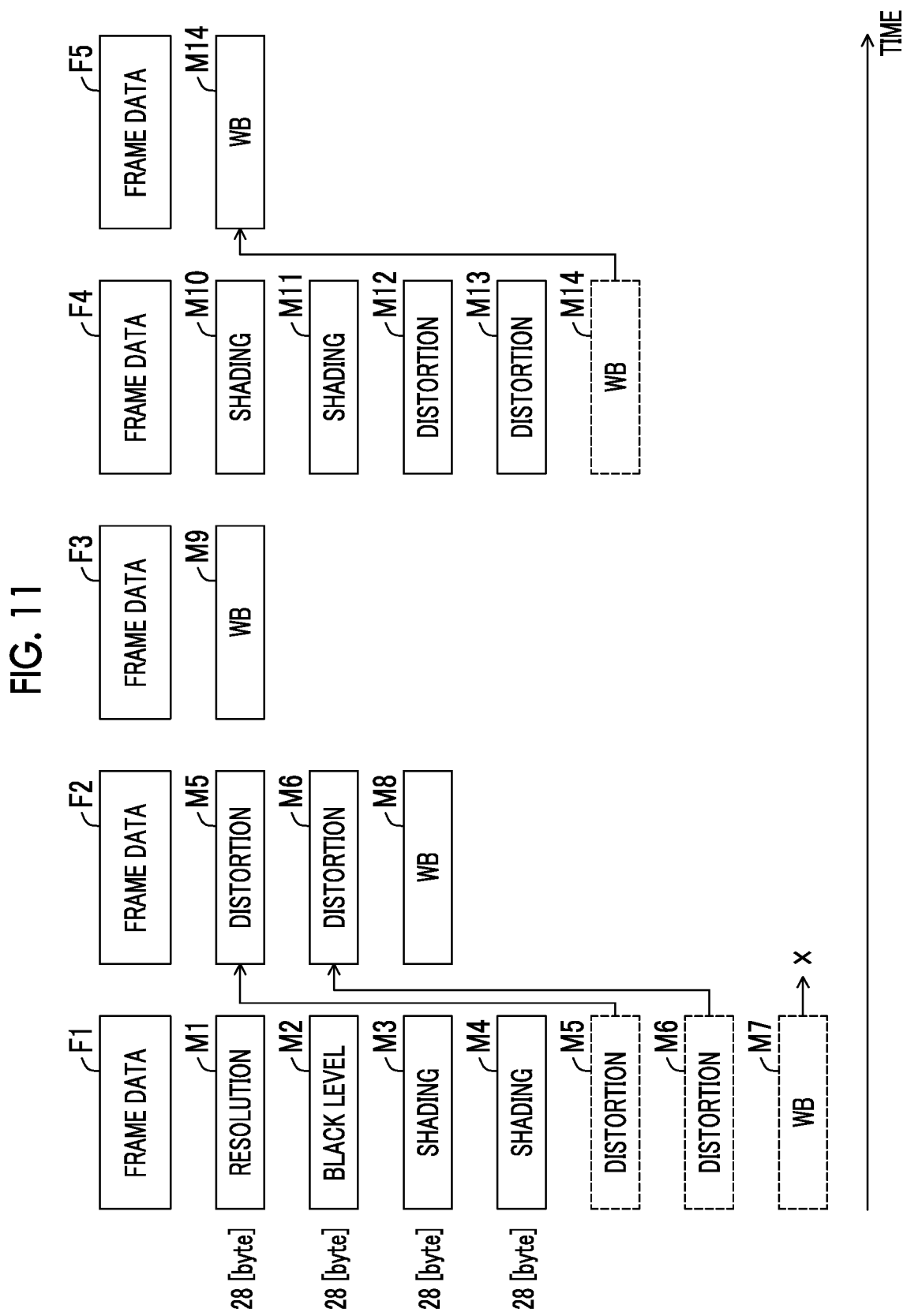
FIG. 11 is a diagram showing an example of output control by the output control unit 110 according to the third embodiment.

FIG. 11 is a diagram showing an example of the output control by the output control unit 110 according to the third embodiment. In the example of the generation of the metadata shown in FIG. 10, the output control unit 110 outputs the frame data and the metadata as shown in FIG. 11, for example.

The number of the metadata associated with the frame data F1 is seven, that is, the metadata M1 to M7 which exceed the number of the metadata (four) that can be added to the frame data F1. In this case, as in the example shown in FIG. 4, the output control unit 110 adds the four metadata M1 to M4 selected from among the metadata M1 to M7 in descending order of the priorities to the frame data F1, and outputs the frame data F1 from the external output I/F 111 to the external recording device 120.

In addition, the output control unit 110 discards the metadata M7 that is not added to the frame data F1 because the metadata M8 indicating the imaging condition related to the white balance similarly to the metadata M7 is associated with the frame data F2 next to the frame data F1. In addition, the output control unit 110 adds the metadata M5 and M6, which are not added to the frame data F1, and the metadata M8 associated with the frame data F2 to the frame data F2, and outputs the frame data F2 from the external output I/F 111 to the external recording device 120.

Stated another way, the metadata M7 which is associated with the frame data F1 but is not added to the frame data F1 is a candidate for the metadata to be added to the frame data F2 and output. However, in a case in which the same type of the metadata M8 associated with the frame data F2 is present, the metadata M8 is overwritten on the metadata M7, added to the frame data F2, and output.

In addition, the output control unit 110 adds the metadata M9 associated with the frame data F3 to the frame data F3, and outputs the frame data F3 from the external output I/F 111 to the external recording device 120.

In addition, the output control unit 110 adds the four metadata M10 to M13 selected from among the metadata M10 to M14 associated with the frame data F4 in descending order of the priorities to the frame data F4, and outputs the frame data F4 from the external output I/F 111 to the external recording device 120.

In addition, the output control unit 110 adds the metadata M14 which is not added to the frame data F4 to the frame data F5 next to the frame data F4, and outputs the frame data F5 from the external output I/F 111 to the external recording device 120.

<Processing by Imaging Apparatus 100 According to Third Embodiment>

Figure 12:
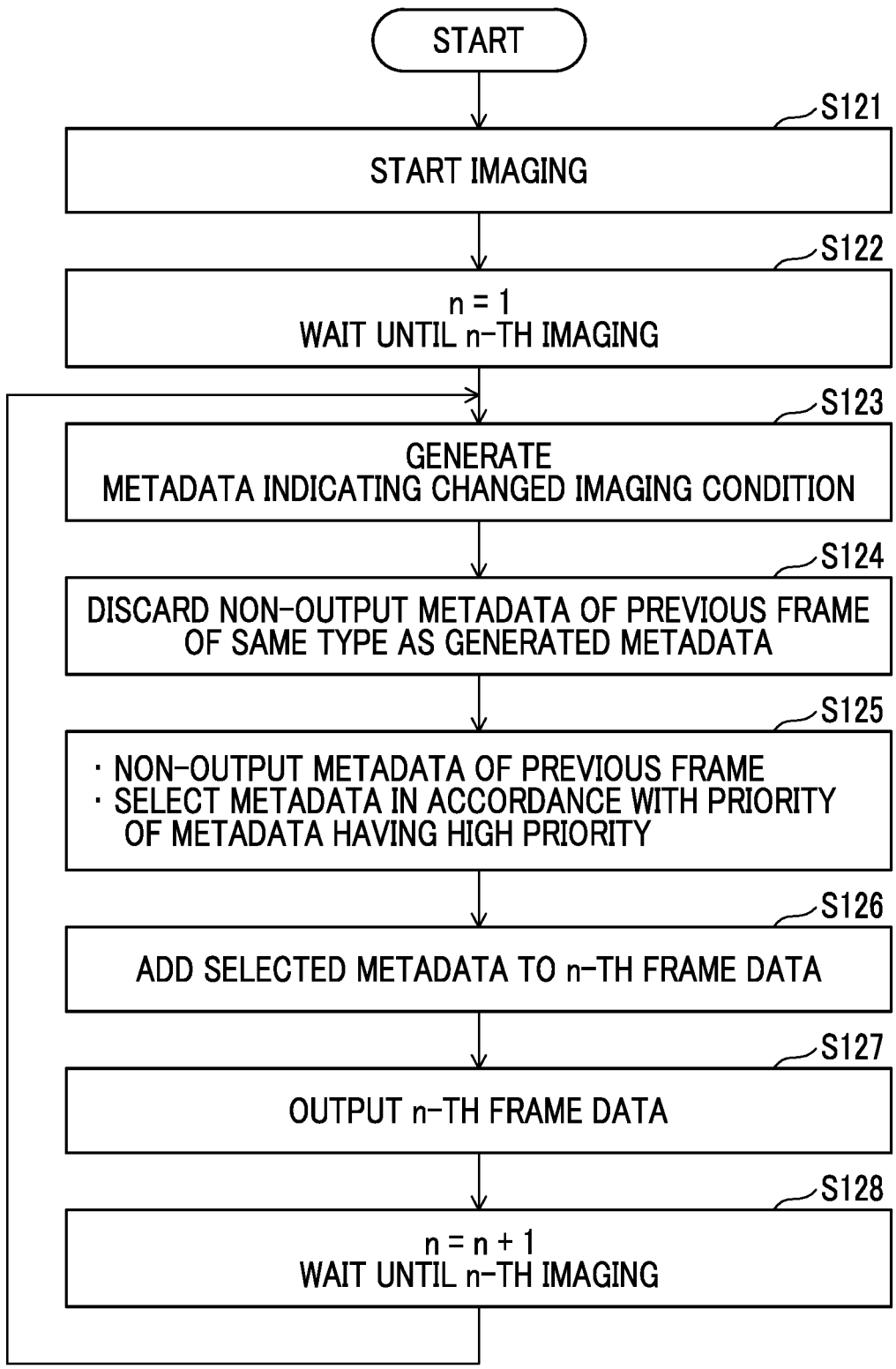
FIG. 12 is a flowchart showing an example of processing by the imaging apparatus 100 according to the third embodiment.

FIG. 12 is a flowchart showing an example of processing by the imaging apparatus 100 according to the third embodiment. The imaging apparatus 100 according to the third embodiment executes the processing shown in FIG. 12, for example. The processing shown in FIG. 12 is executed by the processor that realizes the imaging control unit 104 or the output control unit 110, for example.

Steps S121 to S123 shown in FIG. 12 are the same as steps S51 to S53 shown in FIG. 5. After step S123, in a case in which the non-output metadata (non-output metadata of previous frame) associated with the frame data previous to the n–1th frame data of the same type as the metadata generated in step S123 is present, the imaging apparatus 100 discards the non-output metadata of the previous frame (step S124), and proceeds with step S125.

Steps S125 to S128 shown in FIG. 12 are the same as steps S54 to S57 shown in FIG. 5. In step S125, the metadata discarded in step S124 is not the selection target.

As described above, in a case in which the imaging condition indicated by the metadata which is not added to the first frame data among the metadata associated with the first frame data is changed during the imaging of the second frame data next to the first frame data, the output control unit 110 according to the third embodiment adds the metadata indicating the imaging condition after the change among the metadata before and after the change to the second frame data. As a result, among the metadata of which output is delayed, the metadata that is no longer needed for the development due to the change in the imaging condition is not output, and output efficiency can be improved.

Fourth Embodiment

A different part of the fourth embodiment from the first to third embodiments will be described.

<Output Control by Output Control Unit 110 According to Fourth Embodiment>

Figure 13:
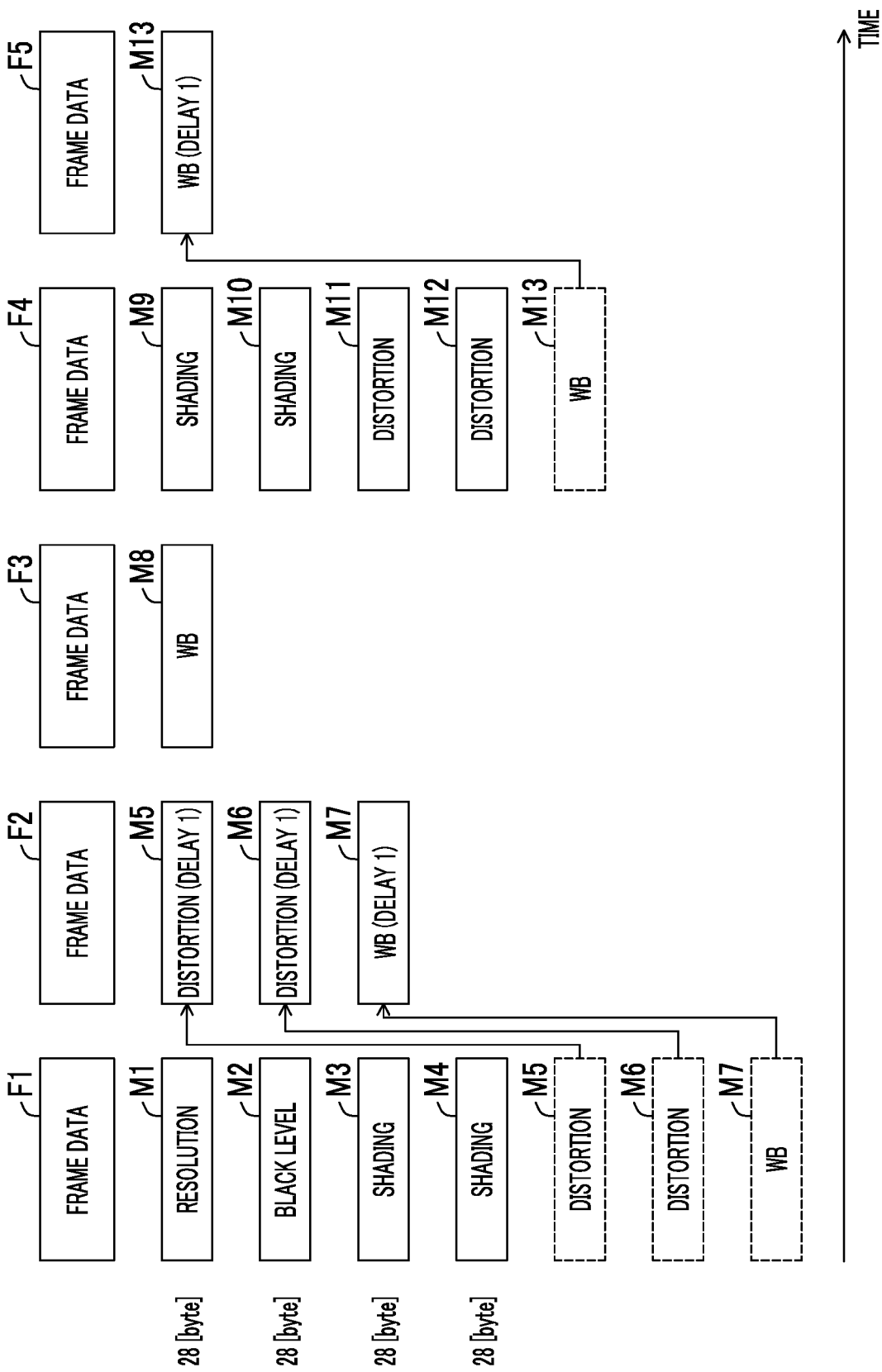
FIG. 13 is a diagram showing an example of output control by the output control unit 110 according to a fourth embodiment.

FIG. 13 is a diagram showing an example of the output control by the output control unit 110 according to the fourth embodiment. In the example of the generation of the metadata shown in FIG. 3, the output control unit 110 according to the fourth embodiment outputs the frame data and the metadata as shown in FIG. 13, for example. The example of the output control shown in FIG. 13 is the same as the example of the output control shown in FIG. 4 except that delay data is added to the delayed output metadata.

Specifically, the output control unit 110 adds the delay data for specifying the frame data F1 to which the metadata M5 and M6 originally correspond, to the metadata M5 and M6 which originally correspond to the frame data F1 but are added to the frame data F2 (that is, delayed) and output. As a result, in the development processing, it is possible to specify that the metadata M5 and M6 are data that should be applied to the frame data F1 and subsequent frame data, and thus it is possible to suppress the influence on the result of the development processing even in a case in which the output of the metadata M5 and M6 is delayed.

In the example shown in FIG. 13, the delay data added to the metadata M5 and M6 is data (delay 1) indicating that the frame data F2 to which the metadata M5 and M6 are added is delayed by one frame with respect to the frame data F1 to which the metadata M5 and M6 originally correspond. As a result, it is possible to suppress an increase in the data amount of the delay data. It should be noted that the delay data added to the metadata M5 and M6 may be the frame number of the frame data F1 to which the metadata M5 and M6 originally correspond.

Similarly, the output control unit 110 adds the delay data for specifying the frame data F4 to which the metadata M13 originally corresponds, to the metadata M13 which originally corresponds to the frame data F4 but are added to the frame data F5 (that is, delayed) and output.

As a result, in the development processing, it is possible to specify that the metadata M13 is data that should be applied to the frame data F4 and subsequent frame data, and thus it is possible to suppress the influence on the result of the development processing even in a case in which the output of the metadata M13 is delayed.

<Example of Development Processing Using Delay Data>

The development processing related to the distortion and the white balance of the frame data F1 is performed by using the metadata M5 to M7 added to the frame data F2. In addition, the development processing related to the white balance of the frame data F4 is performed by using the metadata M13 added to the frame data F5. Other development processing is the same as the development processing in the example of the output control shown in FIG. 4.

<Processing by Imaging Apparatus 100 According to Fourth Embodiment>

Figure 14:
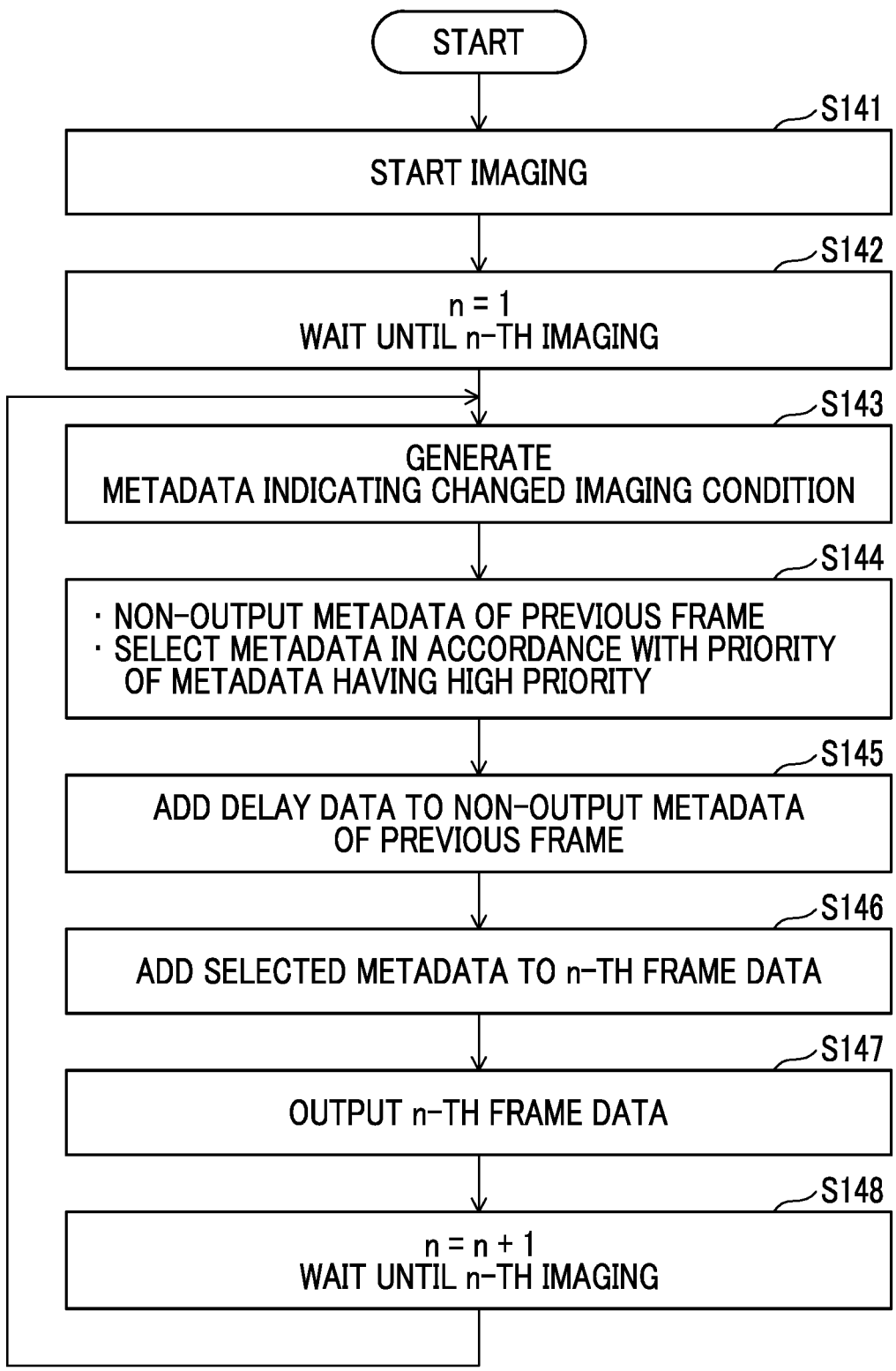
FIG. 14 is a flowchart showing an example of processing by the imaging apparatus 100 according to the fourth embodiment.

FIG. 14 is a flowchart showing an example of processing by the imaging apparatus 100 according to the fourth embodiment. The imaging apparatus 100 according to the fourth embodiment executes the processing shown in FIG. 14, for example. The processing shown in FIG. 14 is executed by the processor that realizes the imaging control unit 104 or the output control unit 110, for example.

Steps S141 to S144 shown in FIG. 14 are the same as steps S51 to S54 shown in FIG. 5. After step S144, in a case in which the delayed metadata (non-output metadata of previous frame) is present in the metadata selected in step S144, the imaging apparatus 100 adds the delay data for specifying the frame data to which the metadata corresponds, to the metadata (step S145). Steps S146 to S148 shown in FIG. 14 are the same as steps S55 to S57 shown in FIG. 5.

As described above, in a case in which the metadata which is not added to the first frame data among the metadata associated with the first frame data is added to the second frame data next to the first frame data, the output control unit 110 according to the fourth embodiment adds the data for specifying the first frame data to the second frame data (for example, the metadata added to the second frame data). As a result, even in a case in which the output of metadata is delayed, the metadata can be retroactively applied to the previous frame data during the development processing, so that it is possible to suppress the influence on the result of the development processing. It should be noted that, in the fourth embodiment, it is not necessary to use the priority in a case in which the metadata to be added to the frame data is selected.

Fifth Embodiment

A different part of the fifth embodiment from the first to fourth embodiments will be described.

In the fifth embodiment, the imaging unit 119 can change the imaging condition of the imaging only for each of a plurality of frames.

<Generation of Metadata by Imaging Control Unit 104 According to Fifth Embodiment>

Figure 15:
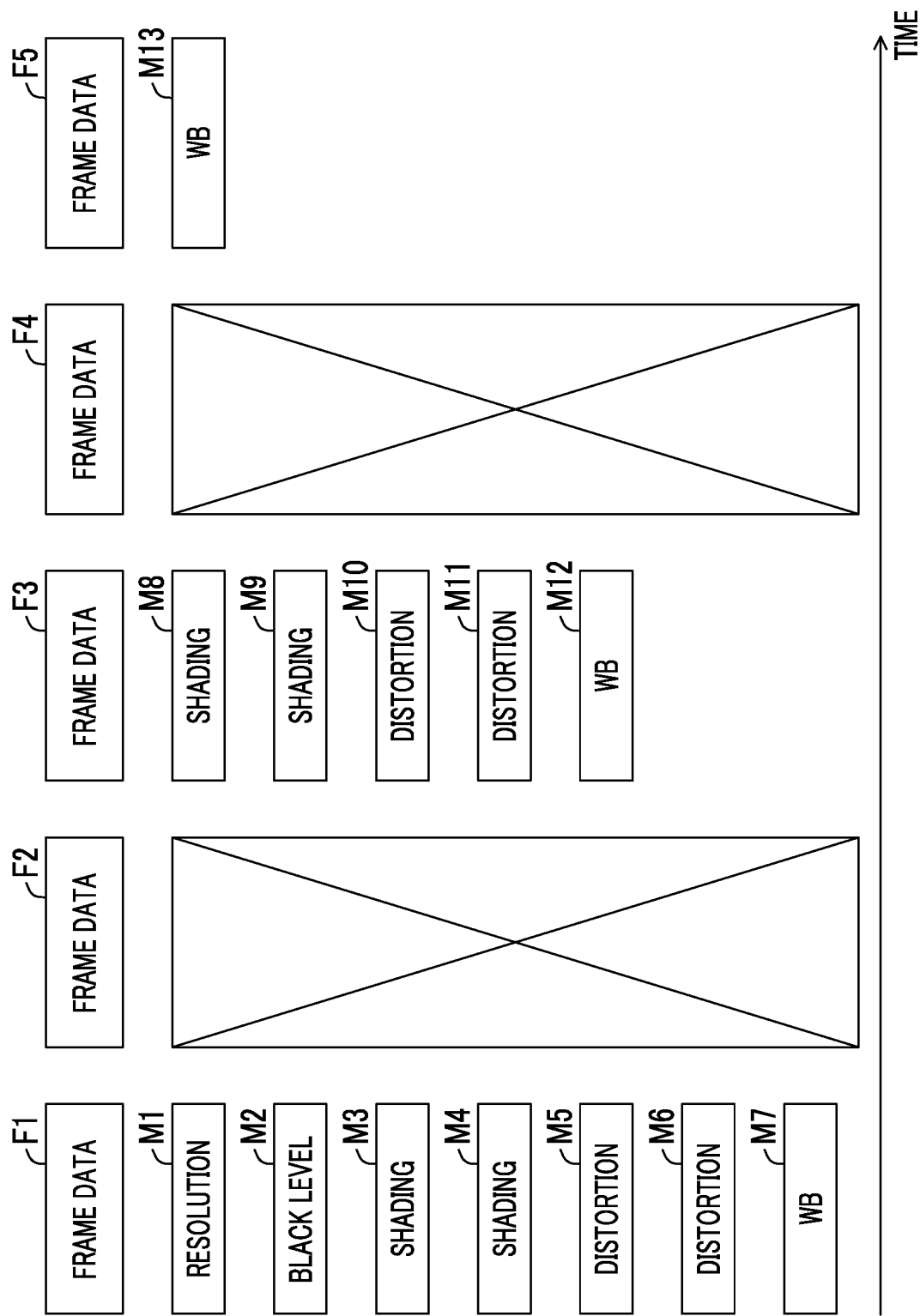
FIG. 15 is a diagram showing an example of generation of the metadata by the imaging control unit 104 according to a fifth embodiment.

FIG. 15 is a diagram showing an example of the generation of the metadata by the imaging control unit 104 according to the fifth embodiment. In FIG. 15, the same parts as those shown in FIG. 3 are designated by the same reference numerals, and the description thereof will be omitted.

The metadata M1 to M13 are metadata generated by the imaging control unit 104. The imaging control unit 104 changes the condition of the imaging by the imaging unit 119 in accordance with the demosaicing image obtained by the demosaicing processing unit 107 or the instruction from the user, but in the example shown in FIG. 15, the imaging condition can be changed in odd-numbered imaging, and the imaging condition cannot be changed in even-numbered imaging. For example, even in a case in which the imaging control unit 104 receives an operation to change the imaging condition between the frame data F1 and the frame data F2, the change is not applied to the imaging of the frame data F2, and is applied to the imaging of the frame data F3 and subsequent frame data.

Therefore, new metadata is generated in association with only the odd-numbered frame data. In the example shown in FIG. 15, the metadata is generated in association with the frame data F1, F3, and F5, but the metadata associated with the frame data F2 and F4 is not generated.

The metadata M1 to M7 are data indicating respective imaging conditions set at the start of the imaging, and are generated in association with the first frame data F1 after the start of the imaging.

In addition, in the example shown in FIG. 15, the imaging conditions related to the shading, the distortion, and the white balance are changed between the imaging of the frame data F2 and the imaging of the frame data F3. In this case, the imaging control unit 104 generates the metadata M8 and M9 indicating the imaging condition related to the shading after the change, the metadata M10 and M11 indicating the imaging condition related to the distortion after the change, and the metadata M12 indicating the imaging condition related to the white balance after the change in association with the frame data F3.

In addition, in the example shown in FIG. 15, the imaging condition related to the white balance is changed between the imaging of the frame data F4 and the imaging of the frame data F5. In this case, the imaging control unit 104 generates the metadata M13 indicating the imaging condition related to the white balance after the change in association with the frame data F5.

<Generation of Metadata by Imaging Control Unit 104 According to Fifth Embodiment>

Figure 16:
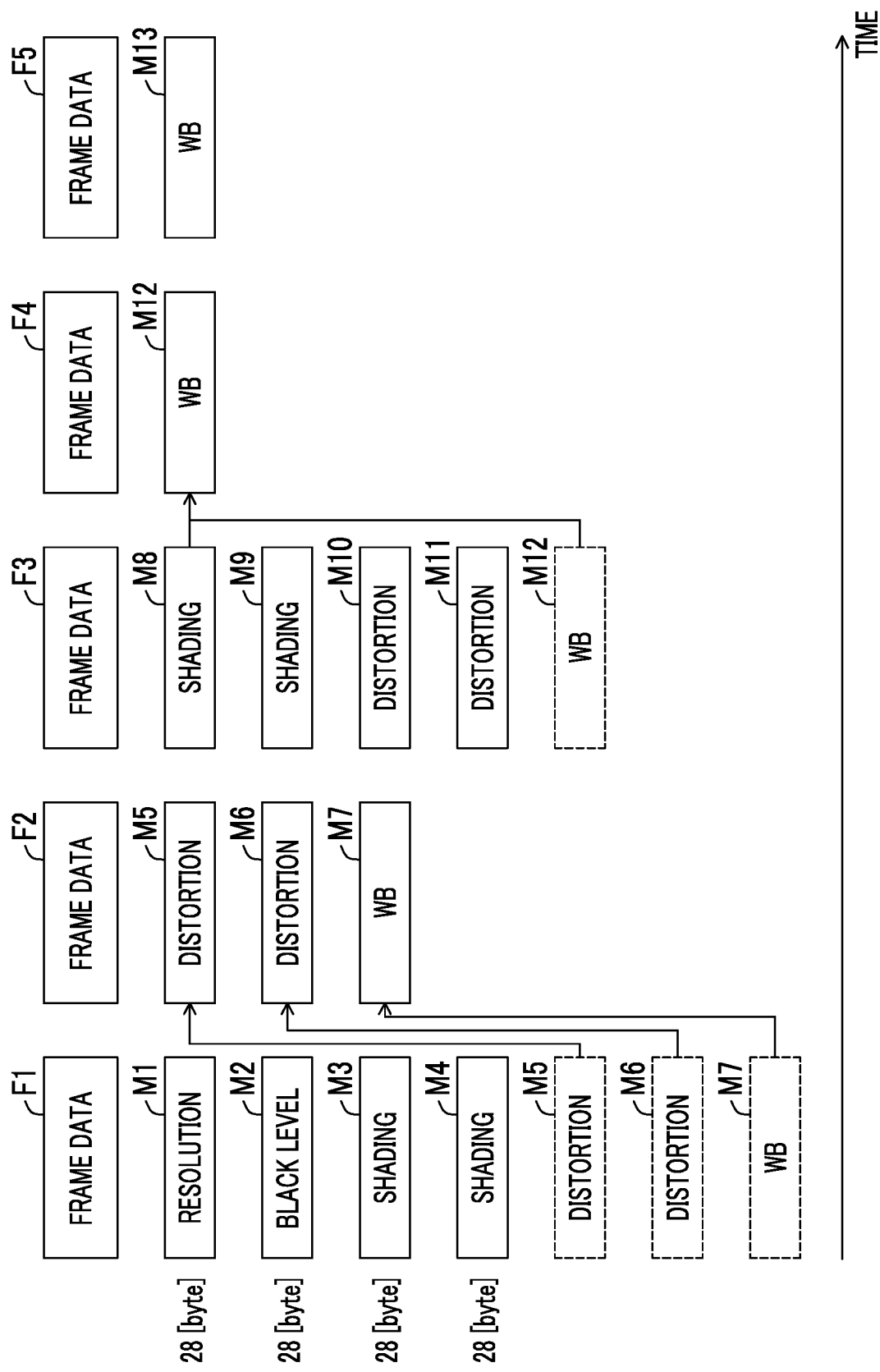
FIG. 16 is a diagram showing an example of output control by the output control unit 110 according to the fifth embodiment.

FIG. 16 is a diagram showing an example of the output control by the output control unit 110 according to the fifth embodiment. In FIG. 16, the same parts as those shown in FIG. 4 are designated by the same reference numerals, and the description thereof will be omitted.

The number of the metadata associated with the frame data F1 is seven, that is, the metadata M1 to M7 which exceed the number of the metadata (four) that can be added to the frame data F1. In this case, as in the example shown in FIG. 4, the output control unit 110 adds the four metadata M1 to M4 selected from among the metadata M1 to M7 in descending order of the priorities to the frame data F1, and outputs the frame data F1 from the external output I/F 111 to the external recording device 120.

In addition, the output control unit 110 adds the metadata M5 to M7 which are not added to the frame data F1 to the frame data F2 next to the frame data F1, and outputs the frame data F2 from the external output I/F 111 to the external recording device 120.

In addition, the number of the metadata associated with frame data F3 is five, that is, the metadata M8 to M12 which exceed the number of the metadata (four) that can be added to frame data F3. In this case, the output control unit 110 adds the four metadata M8 to M11 selected from among the metadata M8 to M12 in descending order of the priorities to the frame data F3, and outputs the frame data F3 from the external output I/F 111 to the external recording device 120.

In addition, the output control unit 110 adds the metadata M12 which is not added to the frame data F3 to the frame data F4 next to the frame data F3, and outputs the frame data F4 from the external output I/F 111 to the external recording device 120.

In addition, the output control unit 110 adds the metadata M13 associated with the frame data F5 to the frame data F5, and outputs the frame data F5 from the external output I/F 111 to the external recording device 120.

As described above, the imaging apparatus 100 according to the fifth embodiment can change the imaging condition of the imaging in the imaging unit 119 only for each of a plurality of frames. As a result, a frequency of the generation of the metadata is reduced, and the metadata can be output even in a case in which the communication capacity is small during the blanking period of the frame data. In addition, the development processing can be performed in consideration of the fact that the imaging condition is not changed in specific frame data. Therefore, it is possible to suppress the influence of the delay in the output of the metadata on the result of the development processing.

For example, in the example shown in FIG. 16, the metadata M5 to M7 added to the frame data F2 of which the imaging conditions are not changed indicate the imaging conditions applied to the immediately previous frame data F1, the metadata M5 to M7 are applied to the development processing of the frame data F1 and subsequent frame data. In addition, the metadata M12 added to the frame data F4 of which the imaging condition is not changed indicate the imaging conditions applied to the immediately previous frame data F3, the metadata M12 can be applied to the development processing of the frame data F3 and subsequent frame data.

Sixth Embodiment

A different part of the sixth embodiment from the first to fifth embodiments will be described. Although the configuration has been described in which the frame data (RAW video data) and the metadata stored in the transitory storage unit 106 of the imaging apparatus 100 is output to the external recording device 120 outside the imaging apparatus 100, the present disclosure is not limited to such a configuration.

<Imaging Apparatus 100 According to Sixth Embodiment>

Figure 17:
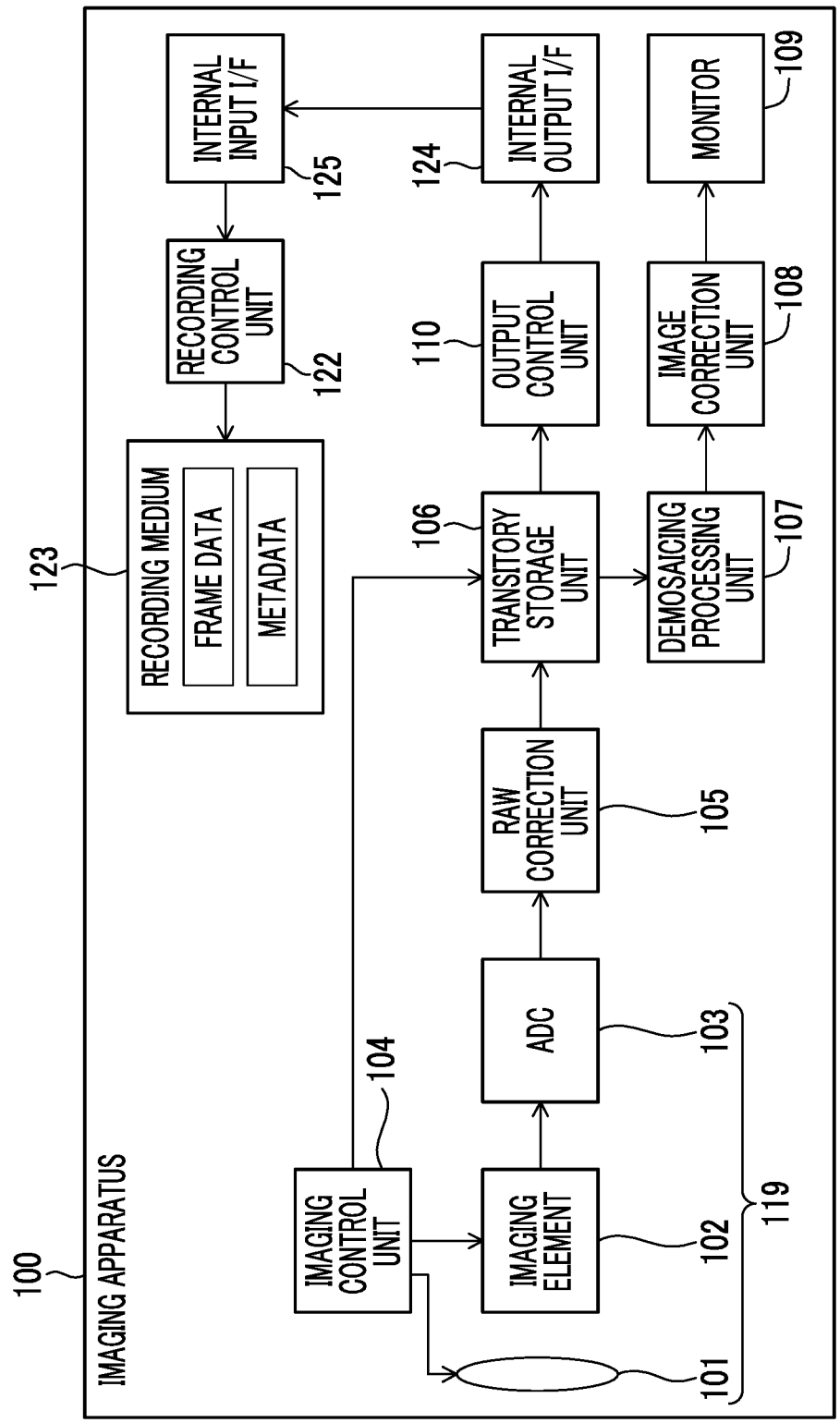
FIG. 17 is a diagram showing an example of the imaging apparatus 100 according to a sixth embodiment.

FIG. 17 is a diagram showing an example of the imaging apparatus 100 according to the sixth embodiment. In FIG. 17, the same parts as those shown in FIG. 1 are designated by the same reference numerals, and the description thereof will be omitted.

The imaging apparatus 100 according to the sixth embodiment comprises an internal output I/F 124, an internal input I/F 125, the recording control unit 122, and the recording medium 123, instead of the external output I/F 111 shown in FIG. 1.

The internal output I/F 124 is an interface, such as the HDMI similar to the external output I/F 111 shown in FIG. 1, but is different from the external output I/F 111 in that the communication with the internal input I/F 125 inside the imaging apparatus 100. The internal input I/F 125 is an interface, such as the HDMI similar to the external input I/F 121 of the external recording device 120 shown in FIG. 1, but is different from the external input I/F 121 in that the internal input I/F 125 is provided inside the imaging apparatus 100.

The recording control unit 122 and the recording medium 123 shown in FIG. 17 have the same configurations as the recording control unit 122 and the recording medium 123 shown in FIG. 1, but are provided inside the imaging apparatus 100. That is, the imaging apparatus 100 shown in FIG. 17 incorporates the high-speed and large-capacity recording medium 123, and the frame data (RAW video data) and the metadata are output to the recording medium 123 by using the interface, such as the HDMI, inside the imaging apparatus 100.

Even in such a configuration, similarly to the imaging apparatus 100 shown in FIG. 1, the metadata indicating the imaging condition is generated in association with the frame data in a case in which the imaging condition of the imaging unit 119 is changed, the generated metadata is added to the frame data, and the frame data is output as the video data before the demosaicing. As a result, it is possible to reduce the data amount of the metadata to be output.

Therefore, the metadata can be output in a limited communication capacity, such as the blanking period of the frame data. In addition, since it is not necessary to increase the communication capacity during the blanking period, it is possible to suppress the problem that, for example, the frame rate is changed due to the increase in the communication capacity during the blanking period or the connection compatibility specifications cannot be observed.

In addition, in a case in which the data amount of the metadata associated with the frame data exceeds the data amount that can be added to the frame data, the imaging apparatus 100 adds the metadata selected based on the priority based on the type of the metadata from among the metadata associated with the frame data to the frame data. As a result, it is possible to preferentially output the metadata of the type used in the development processing. Therefore, it is possible to suppress the influence on the result of the development processing without outputting all the metadata for each frame data.

(Combination of Embodiments)

The embodiments described above can also be realized in combination. For example, in the configuration of the imaging apparatus 100 according to the sixth embodiment, it is possible to realize the same processing as that of the second to fifth embodiments.

Modification Example

In each of the embodiments described above, the processing of adding the metadata to each frame data as much as possible at that time has been described, but the processing is not limited to this. For example, in the example shown in FIG. 4, the imaging apparatus 100 may add only the three metadata M1 to M3 to the frame data F1, and add the metadata M4 to M7 to the frame data F2.

At least the following matters are described in the present specification as described above.

(1)

A video imaging apparatus comprising an imaging unit that generates image data of a video as a plurality of frame data that are continuous in a temporal order, a metadata generation unit that generates metadata indicating an imaging condition of the imaging unit in association with the frame data in a case in which the imaging condition is changed, and an output control unit that adds the metadata to the frame data and outputs the frame data to which the metadata is added as video data before demosaicing, in which, in a case in which a data amount of the metadata associated with the frame data exceeds an addable data amount, the output control unit adds metadata selected based on a priority from among the metadata associated with the frame data to the frame data.

(2)

The video imaging apparatus according to (1), in which the priority is a priority based on a type of the metadata.

(3)

The video imaging apparatus according to (1) or (2), in which the metadata generation unit generates metadata indicating an imaging condition of the imaging unit at start of imaging by the imaging unit in association with first frame data after the start of the imaging.

(4)

The video imaging apparatus according to any one of (1) to (3), in which the output control unit adds metadata which is not added to first frame data generated by the imaging unit among metadata associated with the first frame data to second frame data after the first frame data.

(5)

The video imaging apparatus according to (4), in which the output control unit preferentially adds the metadata which is not added to the first frame data out of metadata associated with the second frame data and the metadata that is not added to the first frame data to the second frame data.

(6)

The video imaging apparatus according to (4) or (5), in which, in a case in which an imaging condition of the imaging unit indicated by the metadata which is not added to the first frame data among the metadata associated with the first frame data is changed during imaging of the second frame data, the output control unit adds metadata indicating the imaging condition after the change among metadata indicating the imaging condition before and after the change to the second frame data.

(7)

The video imaging apparatus according to any one of (4) to (6), in which, in a case in which the metadata which is not added to the first frame data among the metadata associated with the first frame data is added to the second frame data, the output control unit adds data for specifying the first frame data to the second frame data.

(8)

The video imaging apparatus according to any one of (1) to (7), in which the imaging unit is able to change the imaging condition for each of a plurality of frames.

(9)

A video imaging method by a video imaging apparatus including an imaging unit that generates image data of a video as a plurality of frame data that are continuous in a temporal order, the method comprising generating metadata indicating an imaging condition of the imaging unit in association with the frame data in a case in which the imaging condition is changed, adding the metadata to the frame data and outputting the frame data to which the metadata is added as video data before demosaicing, and adding, in a case in which a data amount of the metadata associated with the frame data exceeds an addable data amount, metadata selected based on a priority from among the metadata associated with the frame data to the frame data.

(10)

The video imaging method according to (9), in which the priority is a priority based on a type of the metadata.

(11)

The video imaging method according to (9) or (10), in which metadata indicating an imaging condition of the imaging unit at start of imaging by the imaging unit is generated in association with first frame data after the start of the imaging.

(12)

The video imaging method according to any one of (9) to (11), in which metadata which is not added to first frame data generated by the imaging unit among metadata associated with the first frame data is added to second frame data after the first frame data.

(13)

The video imaging method according to (12), in which the metadata which is not added to the first frame data out of metadata associated with the second frame data and the metadata that is not added to the first frame data is preferentially added to the second frame data.

(14)

The video imaging method according to (12) or (13), in which, in a case in which an imaging condition of the imaging unit indicated by the metadata which is not added to the first frame data among the metadata associated with the first frame data is changed during imaging of the second frame data, metadata indicating the imaging condition after the change among metadata indicating the imaging condition before and after the change is added to the second frame data.

(15)

The video imaging method according to any one of (12) to (14), in which, in a case in which the metadata which is not added to the first frame data among the metadata associated with the first frame data is added to the second frame data, data for specifying the first frame data is added to the second frame data.

(16)

The video imaging method according to any one of (9) to (15), in which the imaging unit is able to change the imaging condition for each of a plurality of frames.

(17)

A non-transitory computer readable recording medium storing a video imaging program of a video imaging apparatus including an imaging unit that generates image data of a video as a plurality of frame data that are continuous in a temporal order, the program causing a processor of the video imaging apparatus to execute a process comprising generating metadata indicating an imaging condition of the imaging unit in association with the frame data in a case in which the imaging condition is changed, adding the metadata to the frame data and outputting the frame data to which the metadata is added as video data before demosaicing, and adding, in a case in which a data amount of the metadata associated with the frame data exceeds an addable data amount, metadata selected based on a priority from among the metadata associated with the frame data to the frame data.

EXPLANATION OF REFERENCES

100: imaging apparatus
101: imaging lens system
102: imaging element
103: ADC
104: imaging control unit
105: RAW correction unit
106: transitory storage unit
107: demosaicing processing unit
108: image correction unit
109: monitor
110: output control unit
111: external output I/F
119: imaging unit
120: external recording device
121: external input I/F
122: recording control unit
123: recording medium
124: internal output I/F
125: internal input I/F
F1 to F5: frame data
M1 to M15: metadata

What is claimed is:

1. A video imaging apparatus comprising:
   an imaging sensor that generates image data of a video as a plurality of frame data that are continuous in a temporal order; and a processor configured to:
generate metadata indicating an imaging condition of the imaging sensor in association with the frame data in a case in which the imaging condition is changed, and
add the metadata to the frame data and outputs the frame data to which the metadata is added as video data before demosaicing,
wherein, in a case in which a data amount of the metadata associated with the frame data exceeds an addable data amount, the processor adds metadata selected based on a priority from among the metadata associated with the frame data to the frame data and adds metadata which is not added to first frame data generated by the imaging sensor among metadata associated with the first frame data to second frame data after the first frame data.

2. The video imaging apparatus according to claim 1, wherein the priority is a priority based on a type of the metadata.

3. The video imaging apparatus according to claim 2, wherein the processor generates metadata indicating an imaging condition of the imaging sensor at start of imaging by the imaging sensor in association with first frame data after the start of the imaging.

4. The video imaging apparatus according to claim 1, wherein the processor generates metadata indicating an imaging condition of the imaging sensor at start of imaging by the imaging sensor in association with first frame data after the start of the imaging.

5. The video imaging apparatus according to claim 1, wherein the processor preferentially adds the metadata which is not added to the first frame data out of metadata associated with the second frame data and the metadata that is not added to the first frame data to the second frame data.

6. The video imaging apparatus according to claim 1, wherein, in a case in which an imaging condition of the imaging sensor indicated by the metadata which is not added to the first frame data among the metadata associated with the first frame data is changed during imaging of the second frame data, the processor adds metadata indicating the imaging condition after the change among metadata indicating the imaging condition before and after the change to the second frame data.

7. The video imaging apparatus according to claim 1, wherein, in a case in which the metadata which is not added to the first frame data among the metadata associated with the first frame data is added to the second frame data, the processor adds data for specifying the first frame data to the second frame data.

8. The video imaging apparatus according to claim 1, wherein the imaging sensor is able to change the imaging condition for each of a plurality of frames.

9. A video imaging method by a video imaging apparatus including an imaging sensor that generates image data of a video as a plurality of frame data that are continuous in a temporal order, the method comprising:
generating metadata indicating an imaging condition of the imaging sensor in association with the frame data in a case in which the imaging condition is changed;
adding the metadata to the frame data and outputting the frame data to which the metadata is added as video data before demosaicing; and
adding, in a case in which a data amount of the metadata associated with the frame data exceeds an addable data amount, metadata selected based on a priority from among the metadata associated with the frame data to the frame data,
wherein metadata which is not added to first frame data generated by the imaging sensor among metadata associated with the first frame data is added to second frame data after the first frame data.

10. The video imaging method according to claim 9, wherein the priority is a priority based on a type of the metadata.

11. The video imaging method according to claim 9, wherein metadata indicating an imaging condition of the imaging sensor at start of imaging by the imaging sensor is generated in association with first frame data after the start of the imaging.

12. The video imaging method according to claim 9, wherein the metadata which is not added to the first frame data out of metadata associated with the second frame data and the metadata that is not added to the first frame data is preferentially added to the second frame data.

13. The video imaging method according to claim 9, wherein, in a case in which an imaging condition of the imaging sensor indicated by the metadata which is not added to the first frame data among the metadata associated with the first frame data is changed during imaging of the second frame data, metadata indicating the imaging condition after the change among metadata indicating the imaging condition before and after the change is added to the second frame data.

14. The video imaging method according to claim 9, wherein, in a case in which the metadata which is not added to the first frame data among the metadata associated with the first frame data is added to the second frame data, data for specifying the first frame data is added to the second frame data.

15. The video imaging method according to claim 9, wherein the imaging sensor is able to change the imaging condition for each of a plurality of frames.

16. A non-transitory computer readable recording medium storing a video imaging program of a video imaging apparatus including an imaging sensor that generates image data of a video as a plurality of frame data that are continuous in a temporal order, the program causing a processor of the video imaging apparatus to execute a process comprising:
generating metadata indicating an imaging condition of the imaging sensor in association with the frame data in a case in which the imaging condition is changed;
adding the metadata to the frame data and outputting the frame data to which the metadata is added as video data before demosaicing; and
adding, in a case in which a data amount of the metadata associated with the frame data exceeds an addable data amount, metadata selected based on a priority from among the metadata associated with the frame data to the frame data,
wherein metadata which is not added to first frame data generated by the imaging sensor among metadata associated with the first frame data is added to second frame data after the first frame data.

* * * * *